(12) United States Patent
Collins et al.

(10) Patent No.: US 6,209,067 B1
(45) Date of Patent: Mar. 27, 2001

(54) COMPUTER SYSTEM CONTROLLER AND METHOD WITH PROCESSOR WRITE POSTING HOLD OFF ON PCI MASTER MEMORY REQUEST

(75) Inventors: Michael J. Collins, Tomball; Michael P. Moriarty, Spring; John E. Larson, Houston; Jens K. Ramsey, Cypress, all of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/566,514

(22) Filed: Dec. 4, 1995

Related U.S. Application Data

(63) Continuation-in-part of application No. 08/324,246, filed on Oct. 14, 1994, now Pat. No. 5,634,073, and a continuation-in-part of application No. 08/324,011, filed on Oct. 14, 1994, now Pat. No. 5,524,235.

(51) Int. Cl.$^7$ ............................. G06F 13/36; G06F 13/14
(52) U.S. Cl. ............................. 711/158; 711/167; 710/5; 710/54; 710/240

(58) Field of Search .................................. 395/470, 494, 395/478, 485, 825, 826, 728, 732; 711/143, 167, 151, 158; 710/5, 6, 240, 244, 54

(56) References Cited

U.S. PATENT DOCUMENTS

| | | | |
|---|---|---|---|
| 5,524,235 | * | 6/1996 | Larson et al. ........................ 711/151 |
| 5,596,729 | | 1/1997 | Lester et al. ........................ 710/128 |
| 5,625,824 | * | 4/1997 | Melo et al. ........................ 710/248 |
| 5,634,073 | * | 5/1997 | Collins et al. ........................ 710/5 |
| 5,634,112 | * | 5/1997 | Thome et al. ........................ 711/154 |

* cited by examiner

*Primary Examiner*—Glenn Gossage
(74) *Attorney, Agent, or Firm*—Akin, Gump, Strauss, Hauer & Feld, LLP

(57) ABSTRACT

A computer system including a memory controller provides a series of queues between a processor and a peripheral component interconnect (PCI) bus and a memory system. Memory coherency is maintained in two different ways. Before any read operations are accepted from the PCI bus, both of the posting queues must be empty. A write posting queue for processor to PCI writes must be flushed before a PCI device can access memory. If the queue is not empty when the PCI device requests a memory read, the PCI device is forced to retry the operation while the write posting queue is flushed. Also, while the queue is flushed, the processor is prevented from further posting to the queue. A timer provides a further temporary time that the processor is precluded from posting to allow enough time for the PCI master to retry the operation.

14 Claims, 22 Drawing Sheets

MDCDSM 714

PRECHARGESM 702

M2INASM

COMPUTER SYSTEM CONTROLLER AND METHOD WITH PROCESSOR WRITE POSTING HOLD OFF ON PCI MASTER MEMORY REQUEST

This application is a continuation-in-part of application Ser. No. 08/324,246, filed Oct. 14, 1994, now U.S. Pat. No. 5,634,073, and application Ser. No. 08/324,011, filed Oct. 14, 1994, now U.S. Pat. No. 5,524,234.

SPECIFICATION

1. Field of the Invention

The present invention relates to an apparatus And method of preventing a processor from starving a local bus master of memory access, and more particularly to holding off the processor from posting further cycles to its write post queues when the local bus master is requesting access to memory and access is denied because flushing the write post queues must occur before the local bus master memory access.

2. Description of the Related Art

Systems in which many devices share a common resource, such as a system bus or main memory, typically utilize arbitration schemes for allocating access to the resource under conditions during which a plurality of devices may concurrently request access. In modern computer systems, input/output (I/O) devices located on expansion buses such as the Industry Standard Architecture (ISA) or the Extended Industry Standard Architecture (EISA) are able to access the main memory through a mechanism commonly known as direct memory access (DMA). DMA allows data to be transferred between I/O devices and the main memory without having to go through the microprocessor, which frees up the microprocessor to perform other functions.

The ISA bus was originally developed to improve on the bus used in the original PC architecture developed by International Business Machines (IBM) Corporation (Armonk, N.Y.). ISA provided for a wider data bus and allowed for faster peripheral or I/O devices. However, as computer system components grew ever more powerful, ISA proved to be inadequate, which necessitated the development of the new bus EISA standard. Both ISA and EISA support DMA transfers, although the EISA bus allows I/O devices to access a 32-bit memory space and enables higher data transfer rates between the I/O devices and main memory.

More recently, a mezzanine bus architecture standard referred to as the Peripheral Component Interconnect (PCI) was developed to allow for connection of highly integrated peripheral components on the same bus as the processor/memory system. PCI provides a bus standard on which high performance peripheral devices, such as graphics devices and hard disk drives, can be connected with the processor/memory module, thereby permitting these high performance devices to avoid the general access latency and the bandwidth constraints that would have occurred if the devices were connected to standard I/O expansion buses such as EISA or ISA. The PCI subsystem comprising the processor/memory system and the high performance peripheral devices is typically coupled to an EISA expansion bus by a PCI-EISA bridge. Consequently, in a system including a PCI bus and an EISA bus, peripheral devices on both the EISA and PCI buses are capable of requesting access to the main memory. Requests from EISA bus masters in such a system are forwarded through the PCI-EISA bridge.

Due to the existence of the many I/O and peripheral devices in the computer system that may access the main memory at any time, contention for the main memory between the microprocessor and the other system devices is very likely. In addition, due to its size, the main memory is typically implemented with dynamic random access memories (DRAMs). Each word in a DRAM needs to be refreshed periodically to prevent data loss due to charge leakage. Refresh controllers, which are typically implemented as part of the memory controller, perform the refresh function by sequentially accessing address locations in the DRAMs. As long as the rate at which each address location is refreshed is above the minimum required rate, data integrity is assured. Thus, in addition to I/O requests, the microprocessor is also competing with the refresh controller for access to the main memory.

In most computer systems, the microprocessor is the most intensive user of the main memory. Therefore, it is desirable that the microprocessor be given the highest priority. However, the arbitration scheme must also recognize that the microprocessor must relinquish control of the memory under certain conditions to prevent starvation of the mezzanine and expansion buses. Consequently, the arbitration scheme must be capable of balancing the needs of the various competing devices so that the efficiency of the computer system is optimized.

SUMMARY OF THE INVENTION

A computer system according to the present invention has a memory controller that provides numerous performance increases, particularly in the PCI bus environment, and can readily work with numerous types and speeds of processors and different speed memory devices.

The memory controller provides a series of queues between the processor and the PCI bus and the memory system to allow deep write posting. In the preferred embodiment, four quadword addresses can be posted from the processor and eight quadword addresses from the PCI bus for write operations. Memory coherency is maintained in two different ways. Before any read operations are accepted from the PCI bus, both of the posting queues must be empty. In this way, all writes are completed prior to the read occurring, so that the main memory is coherent for the read operation from the PCI bus. When a PCI device executes a memory read, the processor cache and (L2) L2 cache are snooped in parallel with the memory read operation. Data is not provided until the snoop operation is complete. If the snoop operation indicates a modified location, a writeback operation is performed before data is provided to the PCI bus. If data is coherent between the memory and caches, data is provided from the memory to the PCI bus. If the queues are not empty when the PCI device executes a memory read, the queues are flushed and the PCI device must retry the operation. A timer prevents further write posting to a processor to PCI queue to allow, on average, enough time for the PCI device to retry the read operation. However, more performance is desired from the processor, and therefore to maintain coherency a content addressable memory (CAM) is utilized as the PCI to memory queue. When the processor performs a read request, the CAM is checked to determine if one of the pending write operations in the PCI to memory queue is to the same address as that read operation of the processor. If so, the read operation is not executed until the PCI memory queue has cleared that entry. If no address hit occurs, the read operation is accepted and executed according to arbitration priority rules. Again, in this manner, the main memory is coherent prior to the read operation occurring. It is noted that allowing two write operations to the same address to be present in the two queues is not a problem and does not produce incoherent results, as the exact timing between the buses would never be clear in any event.

In the preferred embodiment the PCI bus capability of read ahead operations when a Memory Read Multiple has been requested is present. This allows the memory system to obtain data at a high rate and leave it posted for reading by the PCI bus master when indicated by the particular cycle. However, as noted in the background, it is possible that the PCI bus master would abort the cycle prior to its completion. To resolve this problem, a memory controller according to the preferred embodiment receives an abort signal from the PCI bus interface and as soon thereafter as can be done, while maintaining DRAM data integrity, terminates the read ahead cycle, even though the read ahead cycle has not fully completed. Thus, the read ahead cycle is aborted as soon as possible. Therefore, the full read ahead does not occur, so that the situation of an abort occurring during a read ahead operation does not overly hinder performance as would normally be the case.

To further improve the system, the memory controller of the preferred embodiment has improved prediction rules for determining when to precharge the DRAM devices. The prediction rules are based on whether the cycle is coming from the processor or is coming from the PCI bus. By using these new rules, more efficient precharging is done, and additionally, more page mode cycles can be performed than otherwise would have been done according to the prior art.

Finally, the memory controller of the preferred embodiment is highly programmable for multiple speeds and types of processors and several speeds of memory devices, and yet can be simply programmed. The memory controller includes a plurality of registers that specify the number of clock periods for the particular portions of a conventional DRAM cycle, such as the address set up and hold times, column address strobe (CAS*). signal pulse width, the precharge time and the data set up time. These registers are thus consistent with the normal timing concerns and parameters of DRAM devices, so that the designer need only know the particular processor type and clock speed and memory device speed and then the registers can be properly and simply programmed from a small matrix or table. Complex operations and alternatives are not necessary and the clock period values can be easily determined. By the use of the single memory controller for multiple processor types and speeds and plural memory speeds, the economies of scale can now be obtained by increasing manufacturing volumes while still allowing user flexibility.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION OF PREFERRED EMBODIMENT

The following disclosures are hereby incorporated by reference:

U.S. application Ser. No. 08/324,016, entitled "Single Bank, Multiple Way Cache Memory," by Alan L. Goodrum, Jens K. Ramsey, and Michael J. Collins, filed Oct. 14, 1994, now U.S. Pat. No. 5,835,948;

U.S. Pat. No. 5,634,073, entitled "Memory Controller With Write Posting Queues for Processor and I/O Bus Operations and Ordering Logic for Controlling the Queues," by Michael J. Collins, Gary W. Thome, Michael Moriarty, Jens K. Ramsey, and John E. Larson, filed Oct. 14, 1994;

U.S. Pat. No. 5,555,250 entitled "Data Error Detection and Correction System," by William J. Walker and Alan L. Goodrum, filed Oct. 14, 1994;

U.S. application Ser. No. 08/324,020, now abandoned, entitled "Circuit for Invalidating Portions of a Cache Memory if a Write Occurs to a Write Protected Area of Main Memory" by Jens K. Ramsey, filed Oct. 14, 1994; and U.S. application Ser. No. 08/703,927, now U.S. Pat. No. 5,813,022, which is a continuation of U.S. application Ser. No. 08/323,110, now abandoned entitled "Circuit for Placing a Cache Memory Into Low Power Mode in Response to Special Bus Cycles," by Jens K. Ramsey, and Jeffrey C. Stevens, filed Oct. 14, 1994.

Figure 1:
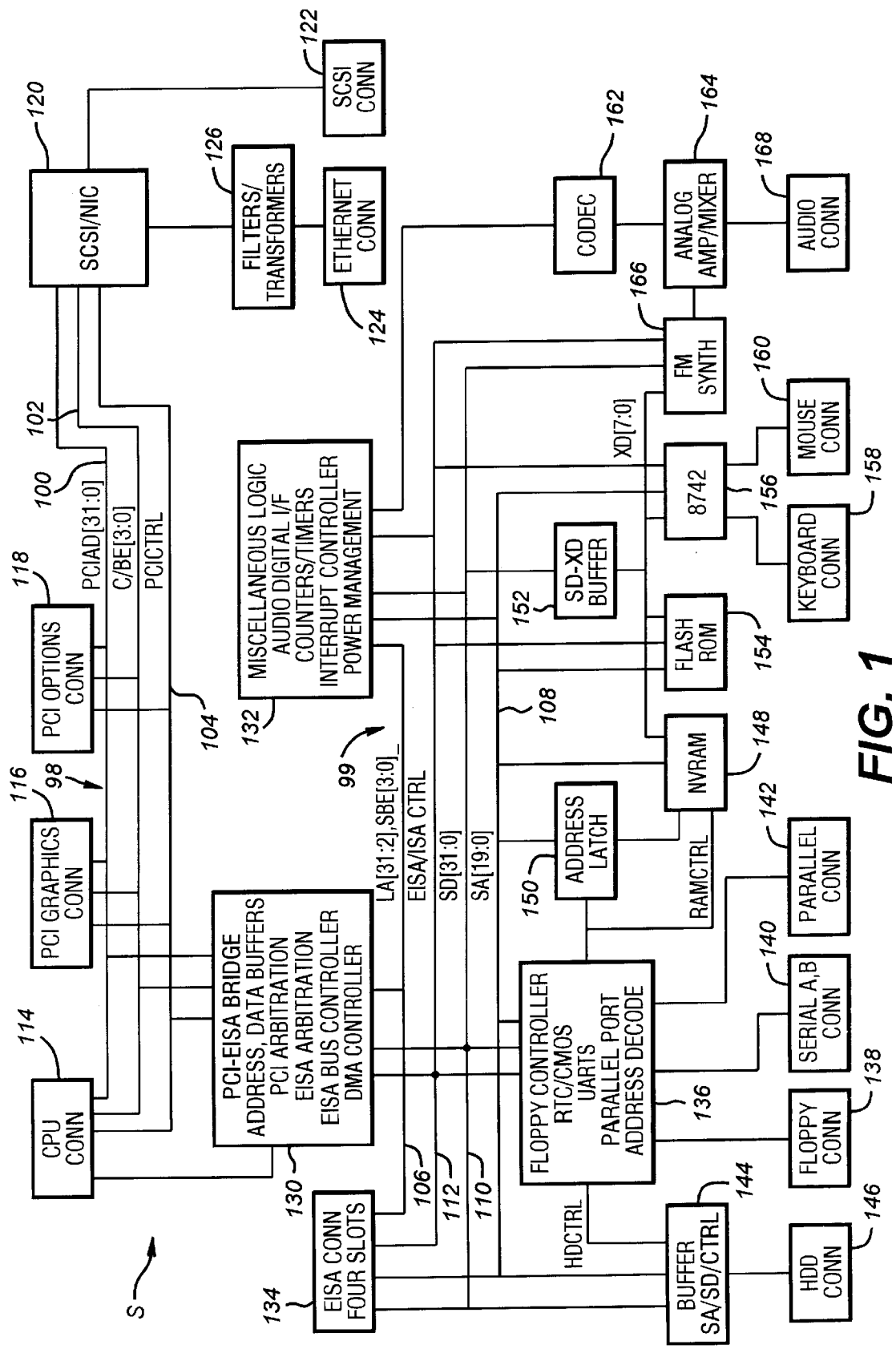
FIG. 1 is a block diagram of a system board in an exemplary computer system according to the preferred embodiment of the present invention.

Referring now to FIG. 1, the system board S of an exemplary computer system according to the preferred embodiment of the present invention is shown. In the preferred embodiment, the system board S contains circuitry and slots for receiving interchangeable circuit boards. In the preferred embodiment, there are two primary buses located on the system board S. The first bus is the PCI or Peripheral Component Interconnect bus 98 which includes address/data portion 100, also referred to as PCIAD, control and byte enable portion 102 and control signal portion 104. The address/data bus PCIAD is preferably 32 bits wide, although it can be upgraded to 64 bits if desired. The second primary bus on the system board S is the EISA bus 99. The EISA bus 99 includes local address (LA) address portion 106, system address (SA) address and byte enable portion 108, SD data portion 110 and EISA/ISA control signal portion 112. The PCI and EISA buses 98 and 99 form the backbones of the system board S.

Figure 2A:
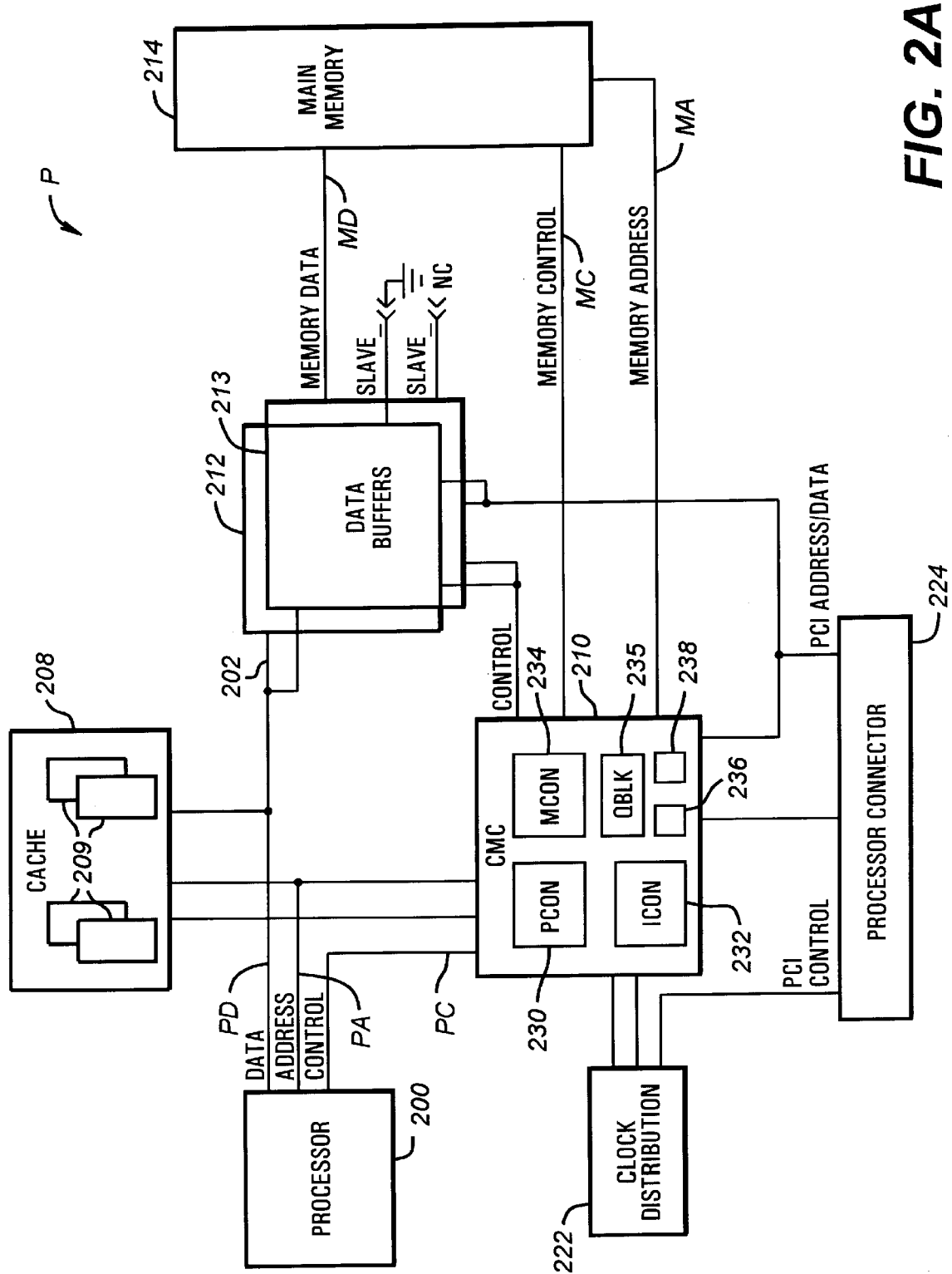
FIG. 2A is a block diagram of a processor board for connection to the system board of FIG. 1.

A central processing unit (CPU) connector 114 is connected to the PCI bus 98 to receive a processor card, such as that shown in FIG. 2A. A PCI graphics connector 116 is connected to the PCI bus 98 to receive a video graphics card (not shown). The graphics card provides video signals to an external monitor (not shown). A PCI option connector 118 is also connected to the PCI bus 98 to receive any additional cards designed according to the PCI standard. In addition, a small computer system interface (SCSI) and network interface controller (N/C) 120 is connected to the PCI bus 98. Preferably, the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and compact disc read only memory (CD-ROM) drives. An Ethernet connector 124 is provided on the system board S and is connected to filter and transformer circuitry 126, which in turn is connected to the controller 120. This forms a network or Ethernet connection for connecting the system board S and computer to a local area network (LAN).

A PCI-EISA bridge 130 is provided to convert signals between the PCI bus 98 and the EISA bus 99. The PCI-EISA bridge 130 includes the necessary address and data buffers and latches, arbitration and bus master control logic for the PCI bus, EISA arbitration circuitry, an EISA bus controller as conventionally used in EISA systems and a direct memory access (DMA) controller. Preferably the PCI-EISA bridge 130 is a single integrated circuit, but other combinations are possible. A miscellaneous system logic chip 132 is connected to the EISA bus 99. In the preferred embodiment, the miscellaneous system logic chip 132 is implemented as an application specific integrated circuit (ASIC). The miscellaneous system logic chip 132 contains a digital audio interface, counters and timers as conventionally present in personal computer systems, an interrupt controller for both the PCI and EISA buses 98 and 99 and power management logic, as well as other miscellaneous circuitry.

A series of four EISA slots 134 are connected to the EISA bus 99 to receive ISA and EISA adapter cards. A combination I/O chip 136 is connected to the EISA bus 99. The combination I/O chip 136 preferably includes a floppy disk controller, real time clock (RTC)/CMOS (complementary metal oxide semiconductor) memory, two universal asynchronous receivers/transmitters (UARTs), a parallel port and various address decode logic. A floppy disk connector 138 for receiving a cable to a floppy disk drive is connected to the combination I/O chip 136. A pair of serial port connectors 140 are also connected to the combination I/O chip 136, as is a parallel port connector 142. A buffer 144 is connected to both the EISA bus 99 and the combination I/O chip 136 to act as a buffer between the EISA bus 99 and a hard disk drive connector 146 to allow connection of an intelligent drive electronics (IDE) type hard disk drive (not shown). A non-volatile random access memory (NVRAM) 148 is connected to the EISA bus 99 and receives its control signals from the combination I/O chip 136. An address latch 150 is connected to the EISA bus 99 and controlled by the combination I/O chip 136 to provide additional addressing capability for the NVRAM 148. Preferably, the NVRAM 148 is used to contain certain system information.

A data buffer 152 is connected to the SD portion of the EISA bus 99 to provide an additional data bus XD for various additional components of the computer system. The NVRAM 148 is connected to the XD data bus to receive its data bits. A flash ROM 154 receives its control and address signals from the EISA bus 99 and is connected to the XD bus for data transfer. Preferably, the flash ROM 154 contains the basic input/output system (BIOS) information for the computer system and can be reprogrammed to allow for revisions of the BIOS. A keyboard controller 156, preferably an Intel Corporation 8742 type keyboard controller, is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end, a coder/decoder (CODEC) chip 162 is connected to the miscellaneous system logic chip 132 and to an analog amplifier and mixer chip 164. An frequency modulator (FM) synthesizer chip 166 is connected to the analog amplifier and mixer 164 and receives digital information from the XD bus. The FM synthesizer 166 is also connected to the control and data portions 110 and 112 of the EISA bus 99 and is controlled by the miscellaneous system logic chip 132. An audio connector 168 is provided to allow external audio connections to the computer and is connected to the outputs and inputs of the analog amplifier and mixer 164.

Referring now to FIG. 2A, a processor board P for use with the system board S is shown. In the processor board P, the CPU or microprocessor 200 is preferably the 64-bit Pentium P54 processor from Intel Corporation, which operates at 50 or 60 MHz externally and 75 or 90 MHz internally. A 32-bit Pentium P24 processor can also be used for operation at 50 MHz externally and 75 MHz internally or 60 MHz externally and 90 MHz internally. The microprocessor 200 can also be a 486 DX4 processor, also from Intel Corporation, which operates at 33 MHz externally and 100 MHz internally. It is contemplated that other processors may be utilized. The microprocessor 200 is connected to a processor bus 202 having data, address and control portions PD, PA and PC. When used with the Pentium P54 processor, the width of the data bus PD is 64 bits. With the Pentium P24 processor or the 486 DX4 processor, the width of the bus PD is 32 bits.

The microprocessor 200 includes an internal or level 1 (L1) cache memory. A level 2 (L2) or external cache memory system 208 is connected to the processor bus 202 to provide additional caching capabilities to improve performance of the computer system. A processor cache and memory controller (CMC) and PCI bridge chip 210 is connected to the control portion PC and to the address portion PA.

The CMC 210 is subdivided into three control blocks or logical portions, the portions being a processor controller (PCON) 230, a memory controller (MCON) 234, and a PCI controller (ICON) 232. The MCON 234 provides control signals MC and memory addresses MA to a main memory 214, which are preferably implemented with dynamic random access memories (DRAMs). The MCON 234 includes a refresh controller for controlling the refresh of the DRAMs in the main memory array 214. The MCON 234 also includes an arbiter for prioritizing requests for the main memory 214 asserted by the microprocessor 200, bus masters on the PCI bus 98, and the refresh controller.

The PCON 230 acts as the interface to the microprocessor 200, in addition to controlling the L2 cache memory 208. Additionally, for PCI reads and writes that are cacheable, the PCON 230 generates a snoop cycle on the processor bus 202 to determine if the snooped address is in either the L1 cache of the microprocessor 200 or the L2 cache memory 208. The ICON 232 interfaces to the PCI bus 98.

To detect if addresses provided by the microprocessor 200 or various PCI bus masters during a memory cycle are located in the L2 cache memory 208, two tag RAMs 236 and 238 are provided in the CMC 210. Preferably, the tag RAMs 236 and 238 are each organized as 2K×20. Depending on the size and associativity of the L2 cache memory 208, portions of processor address PA are used to index to an entry in the tag RAM 236 or 238. Each entry in the tag RAMs 236 or 238 contains a label and state bits to indicate the state of the corresponding line. The label in the selected entry is compared with another portion of the processor address bus PA to determine if the data is in the L2 cache memory 208. If so, the state bits are read to determine the state of the line.

The L2 cache memory 208 supports both the writethrough and writeback cache consistency protocols. If the writethrough protocol is used, all writes to the L2 cache memory 208 are written back to main memory 214 to maintain coherency between the L2 cache 208 and main memory 214. Each line in the writethrough cache is designated either as valid or invalid. The writeback cache uses the MESI (Modified/Exclusive/Shared/Invalid) protocol, as is well known in the art, although the exclusive state is not used in the L2 cache memory 208 according to the preferred embodiment. A line is considered valid if in the shared or modified states, and is invalid if in the invalid state.

The data buffers 212 and 213, which are preferably implemented with ASICs, are connected between the processor data bus PD and the 64-bit memory data bus MD of main memory 14. Control signals to the data buffers 212 and 213 are provided by the CMC 210. The data buffers 212 and 213 are also connected to the PCI address and data bus PCIAD through a connector 224, which is provided to be mateably received by the processor connector 114 of FIG. 1.

The data buffers 212 and 213 each include a SLAVE_ input. As shown, the SLAVE_input to the data buffer 212 is tied to ground and the SLAVE_input of the data buffer 213 is not connected, the input being pulled high by an internal pull-up resistor. The data buffer 212 is referred to as the slave data buffer, and the data buffer 213 is referred to as the master data buffer. Each data buffer receives half the data bits from the processor, memory and PCI data buses PD, MD, and PCIAD, respectively.

The MCON 234 and data buffers 212 and 213 are effectively organized as a triangle or delta so that data transfer can occur between the processor bus 202 and the PCI bus 98, between the processor bus 202 and the memory 214, and between the PCI bus 98 and the memory 214. To this end three sets of queues are provided in a queue block (QBLK) 235: a P2I queue for transfer between the microprocessor bus 202 and the PCI bus 98, a P2M queue for transfers from the processor bus 202 to the memory 214, and an I2M queue for transfers between the PCI bus 98 and the memory 214.

It is noted that the data buffers 212 and 213 also contain queues similar to those in the MCON 234 so that addresses are tracked in the MCON 234 while the data is maintained and transferred through the data buffers 212 and 213. The MCON 234 is organized to control the data buffers 212 and 213 such that the particular control blocks 230, 232 and 234 control their respective portions of the data buffers 212 and 213. The MCON 234 handles the operation of shifting data through the queues in the data buffers 212 and 213, driving data from the queues to the actual memory devices and latching data as required from the memory devices into either the I2M queue or to registers as provided to the processor data bus PD and the PCI bus 98. It is noted that the processor-to-memory and processor-to-PCI queues are unidirectional in the data buffers 212 and 213, but the PCI-to-memory queue is operated bidirectionally, that is it is used for both write data and read ahead data.

The PCON 230 is connected directly to the ICON 232 to provide read addresses for read operations by the microprocessor 200 to the PCI bus 98. The write addresses are provided from the PCON 230 to the P2I queue. Preferably, the P2I queue is four operations deep, so that four write operations can be posted to the queue and thus be pending at one time. The output of the P2I queue is provided to the ICON 232 to provide an address stream. In similar fashion, the read address information and address bank information is provided from the PCON 230 to the MCON 234 for processor reads from the main memory 214. The write addresses and bank information are provided from the PCON 230 to the P2M queue, which is preferably four operations deep in the P54 configuration, so that four write operations from the microprocessor 200 can be posted to the memory array 214. In the 486 or P24 processor configuration, where the data bus PD width is 32 bits but each P2M queue entry in the data buffers 212 and 213 is 64 bits wide, the P2M queue is effectively 8 operations deep during burst writeback cycles. This is allowed only in writeback cycles, as the writeback address is guaranteed to increment sequentially. Thus, memory throughput is improved during burst writeback cycles when a 32-bit processor is used. For other cycles, the P2M queue is effectively 4 operations deep. The output of the P2M queue is provided to the MCON 234.

The ICON 232 is connected to the MCON 234 to provide read addresses and memory bank information for read operations from the PCI bus 98 to the memory 214. In addition, the write address information and bank information is provided from the ICON 232 to the I2M queue. Preferably, the I2M queue is capable of posting eight addresses to provide relatively deep posting from the PCI bus 98 to the memory 214. In burst write operations from the PCI bus 98 to the memory 214, since the PCI data bus PCIAD width is 32 bits but each entry in the I2M queue in the data buffers 212 and 213 is 64 bits wide, 16 burst write addresses can be posted to the I2M queue for improved memory throughput. The output of the I2M queue is connected to the MCON 234. The MCON 234 provides a snoop request signal SNPREQ and the M2I or I2M address that is the address for memory-to-PCI read or PCI-to-memory write operations to the PCON 230. This allows the PCON 230 to perform snoop operations with the L2 cache controller and to provide the operation to the microprocessor 200 so that the L1 cache controller inside the microprocessor 200 can also perform a snoop operation. This is necessary because the L2 cache controller, and the L1 cache controller in the processor 200 in certain cases, are preferably organized as writeback cache controllers, and therefore, snoop operations must occur to maintain memory coherency. The PCON 230 provides signals P_SNPDONE and P_SNPHITM or snoop done and snoop hit to modified data to the MCON 234 to allow the MCON 234 to proceed with read or write operations or retry them as appropriate.

Clock distribution and generation circuitry 222 is associated with the processor card P and is connected to the CMC 210. The clock distribution circuitry 222 provides a clock CLK to the processor bus 202. The processor connector 224 is connected to the CMC 210 and the clock distribution circuitry 222 to provide clocks to the computer system and to provide a PCI interface to allow the microprocessor 200 to access the PCI and EISA buses 98 and 99 and to allow PCI and EISA bus masters to access the main memory array 214. The PCI address and data are multiplexed on the bus PCIAD, with the address provided during the address phase and data provided during the data phase.

In the preferred embodiment, there are five possible requests for the main memory 214: a processor-to-memory write (P2M), a memory-to-processor read (M2P), a PCI-to-memory write (I2M), a memory-to-PCI read (M2I), and refresh. A P2M write refers to a write to the memory 214 and a M2P read refers to a read of the memory 214, both initiated by the microprocessor 200. An I2M write refers to a write to the memory 214 and a M2I read refers to a read of the memory 214, both initiated by a PCI bus master. All memory requests from EISA bus masters are passed through the PCI-EISA bridge 130, which includes the necessary logic to be a bus master on the PCI bus 98. Thus, any EISA originated memory request is effectively a memory request asserted by the PCI-EISA bridge 130.

Generally, the priority of the memory requests are as follows, with some exceptions: (1) second refresh request; (2) P2M write request; (3) M2P read request; (4) I2M write request; (5) M2I read request; and (6) first refresh request. The second refresh request indicates that two refreshes are outstanding. When that occurs, the memory controller 234 gives both outstanding refresh requests the highest priority, executing both refresh cycles. The P2M write request is always higher in priority than other memory requests except the second refresh. However, under certain conditions, a signal M_P2M_NOPOST is asserted to prevent further queuing of P2M write requests. This allows the P2M queue to clear out, thereby allowing requests from the PCI bus 98 to be serviced. However, assertion of the signal M_P2M_NOPOST does not prevent writeback cycles from being queued, as the writeback may be needed by the PCI memory request.

The M2P read request is always lower in priority than the P2M write request, but it is usually higher in priority than I2M write and M2I read requests. However, an unlocked M2P read request is forced lower in priority than an I2M write request if the M2P read is to the same address as an I2M write pending in the I2M queue. When this occurs, the M2P request remains lower in priority than I2M requests until the I2M write request having the matching address is written to the main memory 214. An M2P read request is also forced lower in priority than an I2M write request if the I2M queue is full. Additionally, if an M2I read request is asserted while an I2M write request is pending, the I2M write request is forced higher in priority than the M2P read request to allow the I2M queue to clear, thereby allowing the M2I request to proceed. Further, an M2I read request is forced higher in priority than the M2P read request if the M2I read has been waiting for the M2P request to negate for more than one arbitration cycle.

The I2M write request is always lower in priority than the second refresh request, the P2M write request, and it is generally lower in priority than the M2P read request with the exceptions noted above. The I2M write request is always higher in priority than the M2I read request. The I2M write request is held off if the processor is performing a locked access of the main memory 214. Thus, for a locked processor cycle, the exceptions discussed above do not apply to override the higher priority of M2P read requests over I2M or M2I requests.

A locked or atomic access of the main memory 214 is indicated by a signal LOCK* driven by the microprocessor 200. A locked cycle allows the microprocessor 200 to read an address location in the main memory 214 and be assured that the accessed location is not changed by another bus master before the microprocessor 200 writes back to the same memory location. These type cycles are referred to as read modify write cycles. Locked cycles are also generated during other bus transfers, such as during execution of the XCHG (exchange) instruction when one of its operands is memory-based, when updating a segment or page table entry, and when executing interrupt acknowledge cycles.

The M2I read request is always lower in priority than the second refresh request, the P2M write request, and the I2M write request. However, it is higher in priority than the unlocked M2P read request in the instance noted above.

Finally, the first refresh request is always lower in priority than any of the other requests. However, as noted above, when the second refresh request is asserted, both the first and second refresh requests are executed regardless of whether other requests are pending. Having generally described the arbitration scheme above, a detailed description of the logic in the CMC 210 used to implement the arbitration scheme is described below.

Figure 2B:
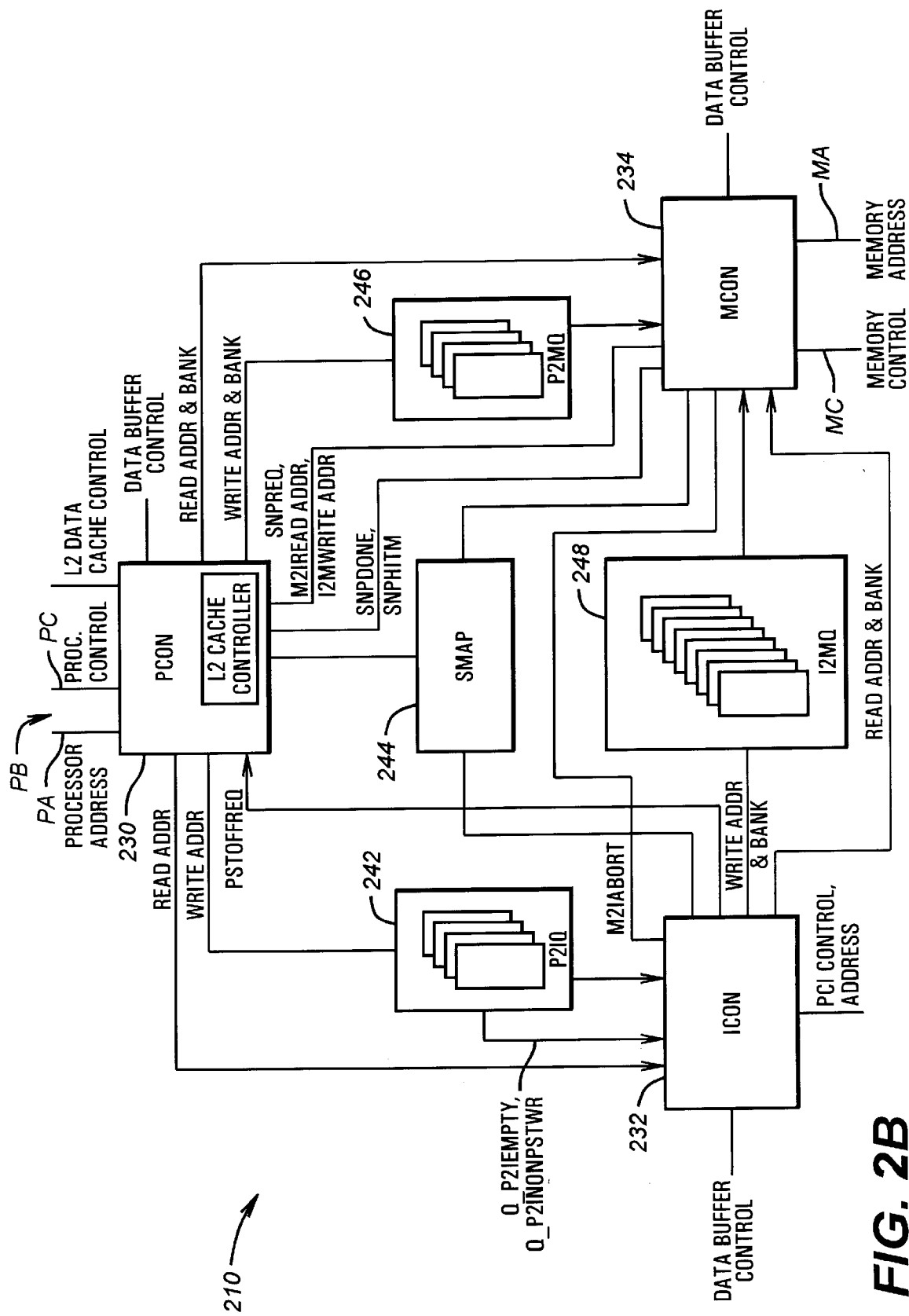
FIG. 2B is a block diagram of the memory controller of FIG. 2A.

Referring now to FIG. 2B, a block diagram of the memory controller 210 is shown. There are three main control blocks in the memory controller 210 and three primary address transfer queues. The three primary control blocks are the processor control or PCON block 230, the PCI control or ICON block 232, and the memory control or MCON block 234. The PCON block 230 provides the interface to the processor bus PB, particularly the processor address bus PA and the processor control bus PC. Additionally, the PCON block 230 is connected to the L2 data cache 208 and provides the necessary control signals. The L2 cache controller is contained in the PCON block 230. In addition, the PCON 230 provides signals to control the data buffers 212 and 213. The ICON block 232 provides data buffer control signals to the data buffer 212 and 213 and in addition interfaces to the PCI bus 98, particularly, the control and address portions. The MCON block 234 is the memory device control portion and is connected to the memory address bus MA and the memory control bus MC, and additionally provides signals to control the data buffers 212 and 213. Each of the particular control blocks 230, 232 and 234 controls different portions of the data buffers 212 and 213 as will be illustrated.

The memory controller 210 and data buffer 212 and 213 are effectively organized as a triangle or delta so that data transfer can occur between the processor bus PB and the PCI bus 98, between the processor bus PB and the memory bus, and between the PCI bus 98 and the memory bus. To this end the PCON block 230 is connected directly to the ICON block 232 to provide read addresses for read operations by the processor 200 to the PCI bus 98. The write addresses are provided from the PCON 230 to a P2I queue 242. Preferably, the P2I queue is four operations deep, so that four write operations can be posted to the queue and thus be pending at one time. It is noted that in the case of a 64 bit Pentium microprocessor 200, this would translate to 8, 32 bit PCI bus 98 operations. The output of the P2I queue 242 is provided to the ICON block 232 to provide an address stream. In similar fashion, the read address information and address bank information is provided from the PCON block 230 to the MCON block 234 for processor reads from the main memory 214. The write addresses and bank information are provided from the PCON block 230 to a P2M queue 246, which is again also preferably four quadword addresses deep, so that four write operations from the processor 200 can be posted to the memory array 214 if a Pentium processor and eight operations if a 486-based processor. The output of the P2M queue 246 is provided to the MCON block 234.

The ICON block 232 is connected to the MCON block 234 to provide read addresses and memory bank information for read operations from the PCI bus 98 to the memory 214. In addition, the write address information and bank information is provided from the ICON block 232 to an I2M queue 248. Preferably, the I2M queue 248 is capable of posting eight quadword addresses to provide relatively deep posting from the PCI bus 98 to the memory 214. The output of the I2M queue 248 is connected to the MCON block 234. An SMAP or system map block 244 is connected to the control block 230, 232 and 234 to provide various signals as necessary.

In addition, a signal referred to as M2IABORT is provided from the ICON block 232 to the MCON block 234 to allow the MCON block 234 to determine when a Memory Read Multiple operation has been aborted by the PCI bus master, as well as for other PCI abort operations. For this discussion, only the Memory Read Multiple case is of interest and the other cases will not be discussed. The MCON block 234 provides a snoop request or SNPREQ signal, the M2I read address that is the address for memory to PCI read operations and the I2M write address to the PCON block 230. This allows the PCON block 230 to perform snoop operations with the L2 cache controller and to provide the operation to the processor 200 so that the L1 cache controller inside the processor 200 can also perform a snoop operation. Snooping of read addresses as well as write addresses is necessary because the L2 cache controller, and the L1 cache controller in the processor 200 in certain cases, are preferably organized as writeback cache controllers, and therefore, snoop operations must occur on reads to maintain memory coherency. The PCON block 230 provides the SNPDONE and SNPHITM or snoop done and snoop hit to modified signals to the MCON block 234 to allow the MCON block 234 to proceed with the read or write operations or retry a read operation if appropriate.

Figure 2C:
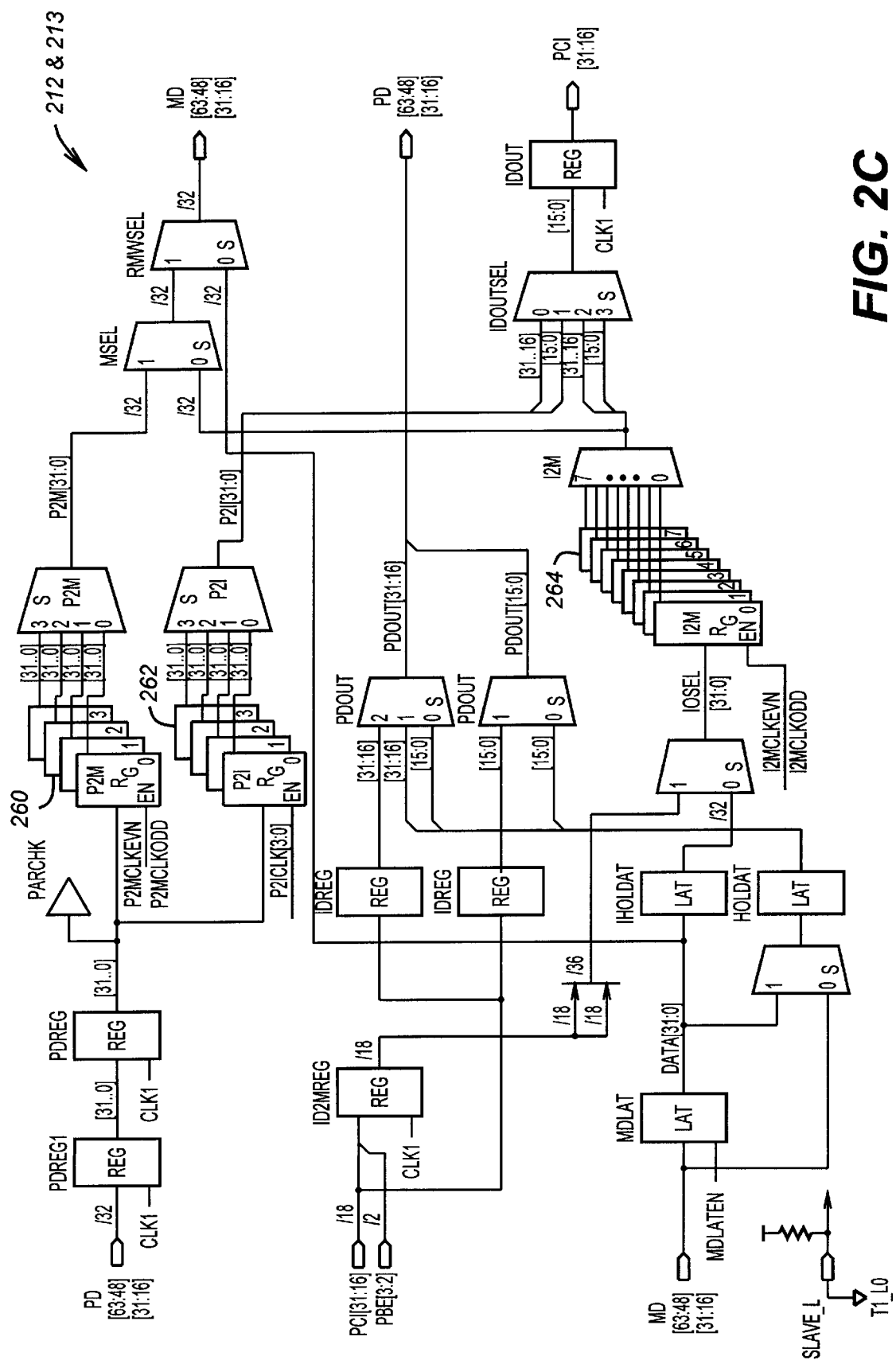
FIG. 2C is a block diagram of the data buffer of FIG. 2A.

Referring now to FIG. 2C, more details of the data buffers 212 and 213 are shown. It can be noted that the data buffers 212 and 213 also contain queues 260, 262 and 264 similar to those in the memory controller 210 so that addresses are tracked in the memory controller 210 while the data is maintained and transferred through the data buffers 212 and 213. The memory controller 210 is organized to control the data buffers 212 and 213 such that the particular control blocks 230, 232 and 234 control their respective portions of the data buffers 212 and 213. For example, the PCON block 230 controls the latching of data from the processor data bus into the various registers and the output enable or driving of the data from the memory onto the processor data bus PD. Similarly, the ICON block 232 handles latching of data into the various registers from the PCI bus 98 and the output enables of the data to the PCI bus 98. The MCON block 234 handles the operation of shifting data through the various queues 260, 262 and 264, driving data from the queues 260, 262, 264 to the actual memory devices and latching data as required from the memory devices into either the I2M queue 264 or to registers as provided to the processor data bus PD and the PCI bus 98. It is noted that the processor to memory and processor to PCI queues 260 and 262 are unidirectional in the data buffers 212 and 213 but the PCI to memory queue 264 is operated bidirectionally, that it is used for both write data and the read ahead data. Operation will be clearer according to the description below.

Figure 3A:
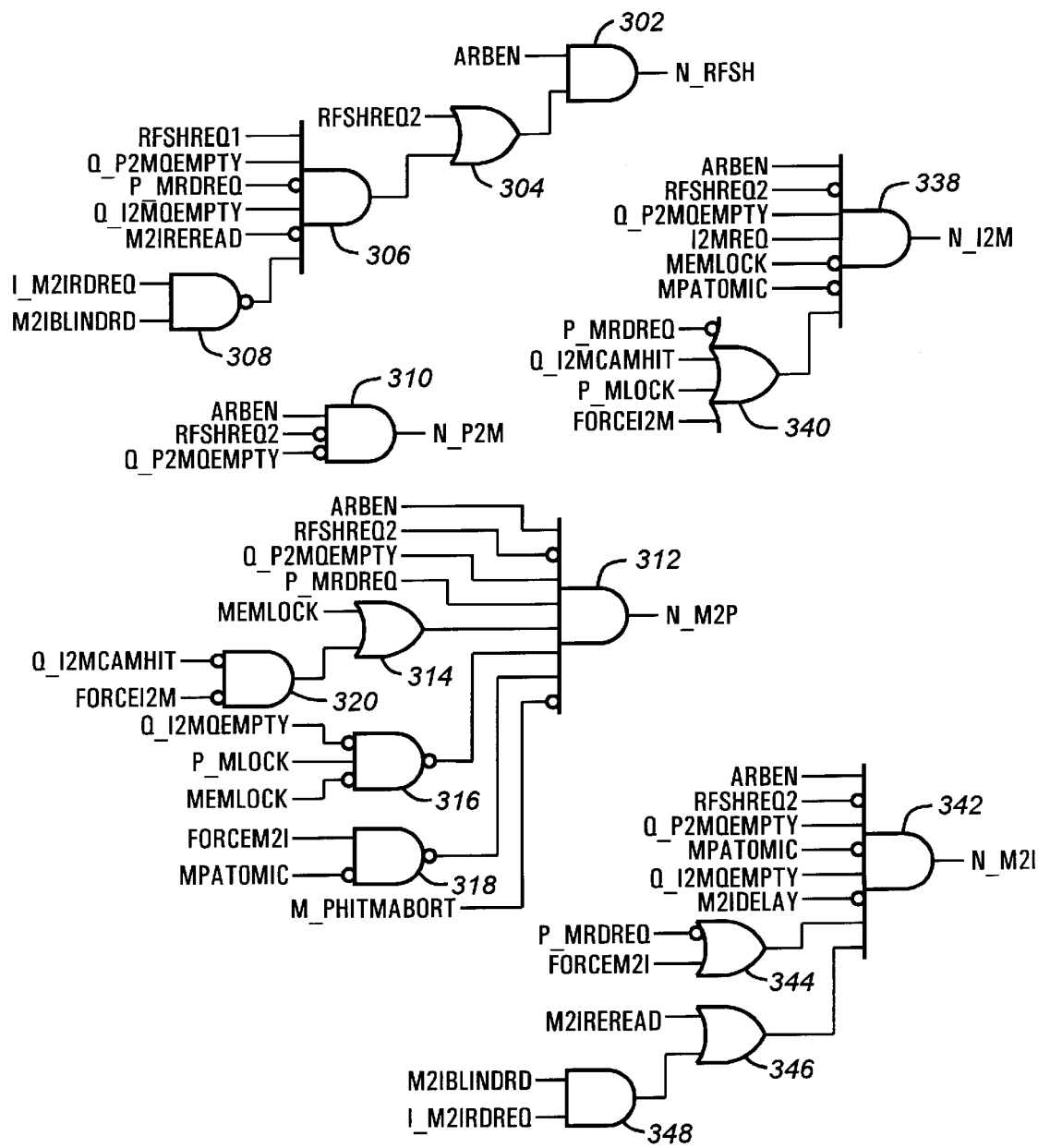
FIGS. 3A and 3B are logic diagrams of circuitry for asserting signals indicating the type of memory request granted.
Figure 3B:
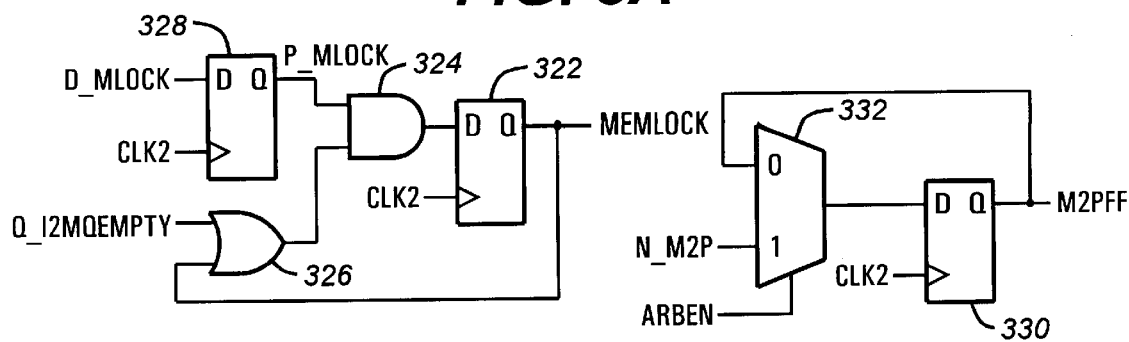

Referring now to FIGS. 3A and 3B, logic for granting access to the main memory 214 to one of the memory requests is shown. Assertion of signals N_RFSH, N_P2M, N_M2P, N_I2M, or N_M2I indicates the granting of a refresh request, a P2M write request, an M2P read request, an I2M write request, or an M2I read request, respectively, to be the next memory operation.

The signal N_RFSH is provided by an AND gate 302, whose first input receives a signal ARBEN and whose second input is connected to the output of an OR gate 304. The signal ARBEN indicates when arbitration is enabled, and is generally asserted high when a memory request is not currently being serviced. In other words, if a refresh, P2M write, M2P read, I2M write, or M2I read request has been granted access to the main memory 214, the signal ARBEN is deasserted low until some time before the memory request has completed execution. Since the MCON 234 is a pipelined memory system, the next request is observed before completion of the current memory request. Preferably, in all cycles except M2P read cycles, the signal ARBEN is re-asserted when the CAS* signals to the memory 214 are first asserted for the current memory cycle. For M2P read cycles, the signal ARBEN is re-asserted one CLK2 delay after assertion of the CAS* signals. The first input of the OR gate 304 receives a signal RFSHREQ2, and its second input is connected to the output of an AND gate 306. The signal RFSHREQ2 when asserted high indicates that a second refresh request has been generated. Thus, if the signal ARBEN is asserted high, the signal N_RFSH is asserted.

M2IREREAD, which indicates that an M2I read request has been regenerated after detection of a snoop hit to a modified line in the L1 cache of the microprocessor 200 or the L2 cache memory 208. The last input of the AND gate 306 is connected to the output of a NAND gate 308, whose inputs receive signals I_M2IRDREQ and M2IBLINDRD. The signal I_M2IRDREQ is provided by the ICON 232 for indicating if an M2I read request has been asserted, and the signal M2IBLINDRD is asserted high if the signal I_M2IRDREQ is asserted. The signal M2IBLINDRD when asserted indicates that a snoop request has been provided to the PCON 230, but that the status of the snoop cycle has not yet been determined. The signal M2IBLINDRD is described further in conjunction with FIG. 13 below. Thus, it is seen that the first refresh request has the lowest priority, as it is not recognized unless no other memory requests are pending.

Figure 5A:
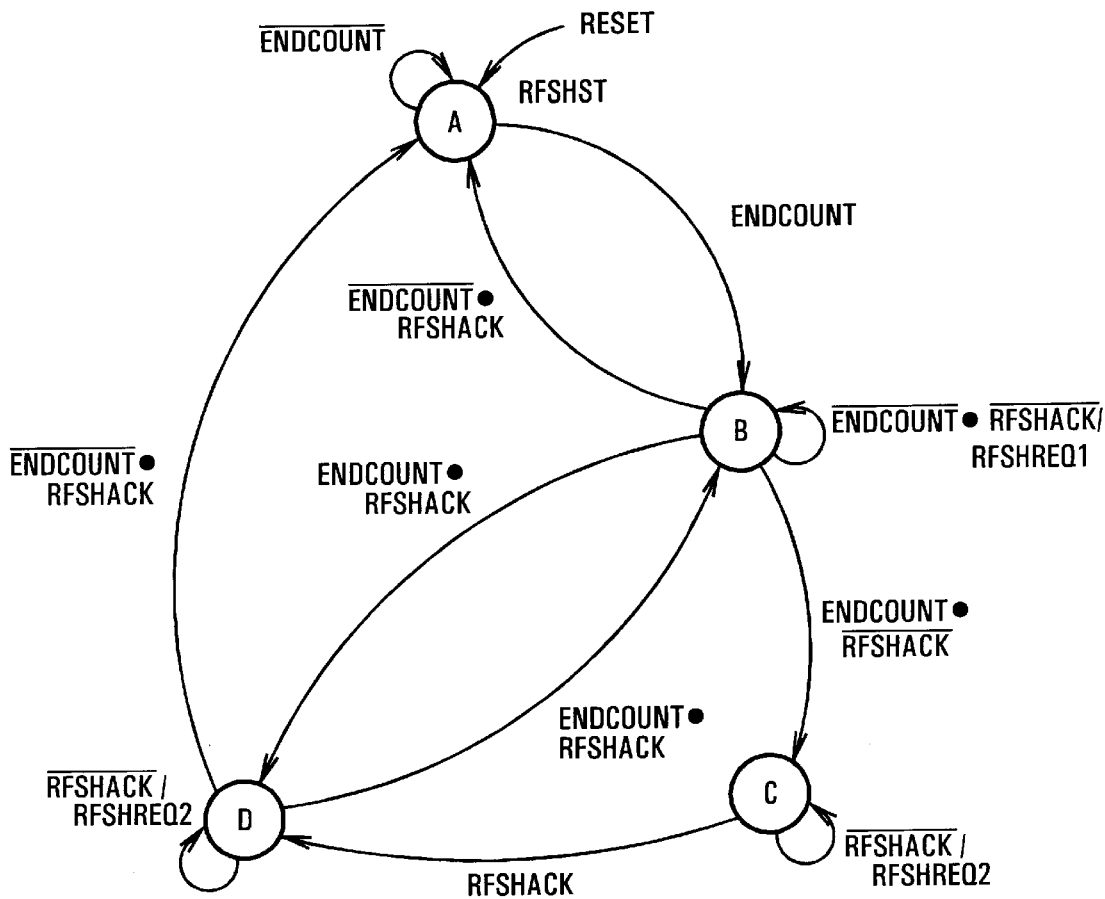
FIGS. 5A and 5B are a state machine and related logic of circuitry for generating refresh signals.
Figure 5B:
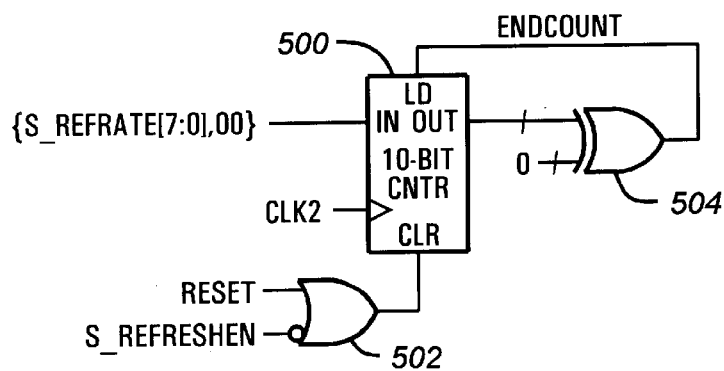
Figure 6A:
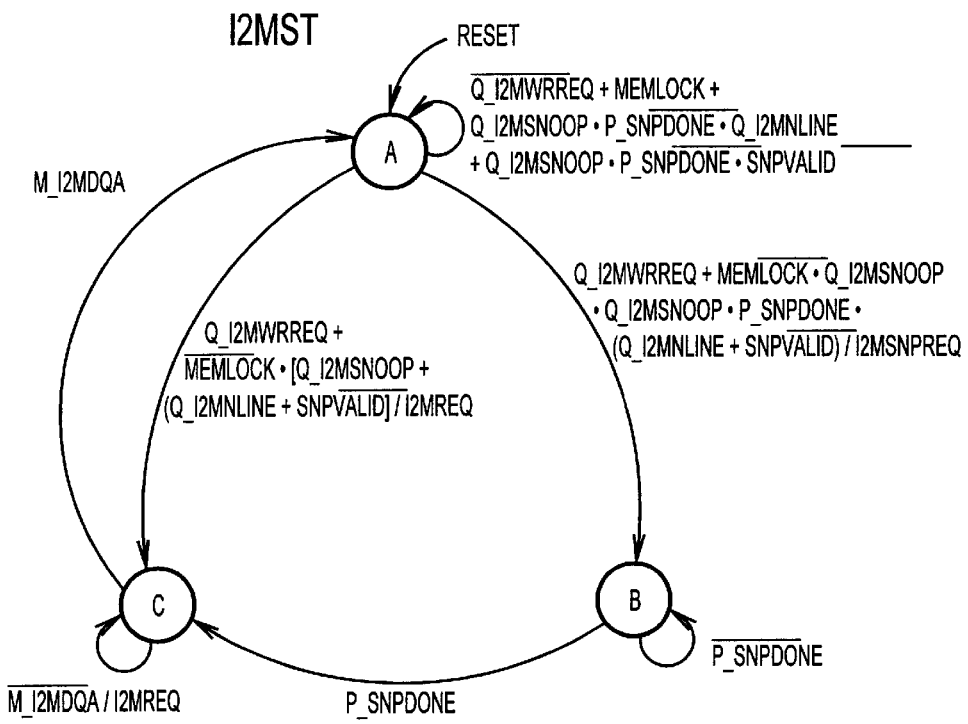
FIGS. 6A, 6B, 6C and 6D are a state machine related logic of circuitry for handling write requests to the memory initiated by a PCI bus master.
Figure 6D:
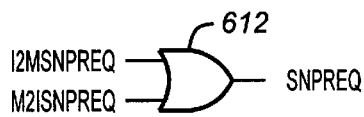
Figure 6B:
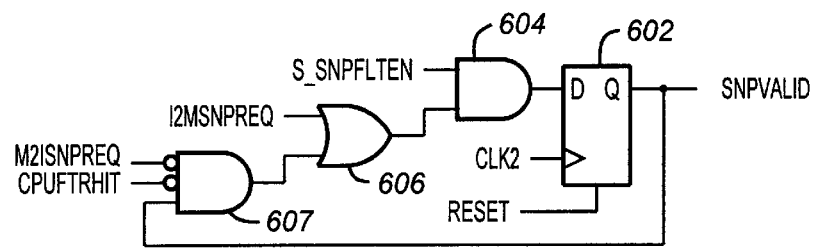
Figure 6C:
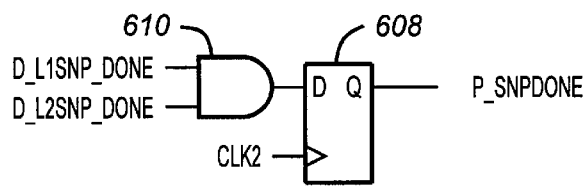

Referring now to FIGS. 5A and 5B logic for generating the refresh signals RFSHREQ1 and RFSHREQ2 is shown. A decrementing 10-bit counter 500 determines when a refresh of the main memory 214 is needed. The counter 500 is initially loaded with a value {S_REFRATE[7:0], 00}. The signals S_REFRATE[7:0] are provided by a configuration register. The PCI bus defines a separate configuration space to allow the computer system to initialize and configure its components. More details on PCI configuration cycles can be obtained by review of the PCI Specification 2.0 from the PCI Special Interest Group in care of Intel Corporation, which is hereby incorporated by reference. The signals S_REFRATE[7:0], shifted to the left by two bits, defines the number of system clocks between refresh requests. The load input of the counter 500 is connected to a signal ENDCOUNT, and the counter 500 is clocked by a clock signal CLK2, which is the internal clock of the CMC 210. The clear input of the counter 500 is connected to the output of an OR gate 502, whose inputs receive a signal RESET and the inverted state of a signal S_REFRESHEN. Assertion of the signal RESET causes the computer system to reset. The signal S_REFRESHEN corresponds to bit 7 of a configuration register. When set high, the signal S_REFRESHEN indicates that refresh is enabled. The counter 500 is reset to the value 0 on the rising edge of its clear input. The output of the counter 500 is connected to one input of a comparator 504, which asserts the signal ENDCOUNT high when the counter 500 decrements to the value 0. Assertion of the signal ENDCOUNT causes the counter 500 to be reloaded.

The signal ENDCOUNT is provided to a state machine RFSHST. On system reset, the state machine RFSHST enters state A, where it remains until the signal END-COUNT is asserted high. When that occurs, control transitions from state A to state B. In state B, the signal RFSHREQ1 is asserted high. The state machine RFSHST remains in state B if both signals ENDCOUNT and RFSHACK are deasserted low. Assertion of the signal RFSHACK indicates that the current refresh request has been granted and is being serviced. Thus, if the signal RFSHACK is asserted high, and the signal ENDCOUNT is deasserted low, control returns to state A. However, if the counter 500 indicates that another refresh cycle is needed by asserting the signal ENDCOUNT, and the signal RFSHACK remains deasserted low, the state machine RFSHST transitions from state B to state C. In state C, the signal RFSHREQ2 is asserted high to indicate that two refresh requests are outstanding. Control remains in state C until the signal RFSHACK is asserted high, in which case the state machine RFSHST transitions from state C to state D. This indicates that one of the pending refresh requests has been serviced. In state D, the signal RFSHREQ2 is maintained high to ensure that the remaining refresh request maintains the highest priority.

The state machine RFSHST transitions from state B to state D if both signals ENDCOUNT and RFSHACK are asserted high, indicating that the counter 500 has decremented to 0 at the same time that the first refresh request is granted access to the main memory 214. The state machine RFSHST remains in state D while the signal RFSHACK is deasserted low. If the signal RFSHACK is asserted high, and the signal ENDCOUNT is asserted high to indicate that a new refresh request is needed, control transitions from state D to state B, where the low priority refresh request signal RFSHREQ1 is asserted high. However, if the signal RFSHACK is asserted high and the signal ENDCOUNT remains deasserted low, the state machine RFSHST transitions from state D back to the idle state A.

Returning now to FIGS. 3A and 3B, the signal N_P2M is provided by an AND gate 310. The inputs of the AND gate 310 receive the arbitration enable signal ARBEN, the inverted state of the signal RFSHREQ2, and the inverted state of the signal Q_P2MQEMPTY. This guarantees that any P2M write request pending in the P2M queue has the highest priority if the signal RFSHREQ2 is deasserted.

The signal N_M2P is provided by an AND gate 312, which receives the signal ARBEN, the inverted state of the signal RFSHREQ2, the signal Q_P2MQEMTY, the signal P_MRDREQ, and the inverted state of a signal M_PHITMABORT. The other inputs of the AND gate 312 are connected to the output of an OR gate 314, the output of a NAND gate 316 and the output of a NAND gate 318. The signals RFSHREQ2 and Q_P2MQEMTY are provided to the AND gate 312 to ensure that the M2P read request remains lower in priority than the second refresh request and the P2M write request. The signal P_MRDREQ indicates a processor-to-memory read request is pending.

The first input of the OR gate 314 receives a signal MEMLOCK and the second input is connected to the output of a NOR gate 320. The NOR gate 320 receives signals Q_I2MCAMHIT and FORCEI2M. The signal MEMLOCK is provided by a D flip flop 322, which is clocked by the signal CLK2. The D input of the D flip flop is connected to the output of an AND gate 324, whose first input is connected to the output of an OR gate 326 and whose second input receives a signal P_MLOCK. The OR gate 326 receives the signal MEMLOCK and a signal Q_I2MQEMPTY, which is asserted high when the I2M queue is empty. The signal P_MLOCK is provided by a D flip flop 328, which is clocked by the signal CLK2. The D input of the D flip flop 328 receives a signal D_MLOCK, which is asserted high if a locked cycle is generated by the microprocessor 200 on the processor bus 202, as indicated by the signal LOCK* being asserted low, and a locked cycle is not currently pending in the I2M queue. A PCI locked request is indicated by the PCI signal LOCK* being asserted low. Thus, if a CPU locked cycle is asserted, a PCI locked cycle is not currently pending, and the I2M queue is currently empty, the signal MEMLOCK is latched high by the D flip flop 322 to indicate that a processor initiated locked access of the main memory 214 is currently pending.

The signal Q_I2MCAMHIT, when asserted high, indicates that the processor address PA provided with the M2P read request matches the address of an I2M write request in the I2M queue. If this occurs, the M2P read request is forced lower in priority than I2M write requests until the I2M write request having the matching address has been serviced, at which time the signal Q_I2MCAMHIT is deasserted low.

Figure 4:
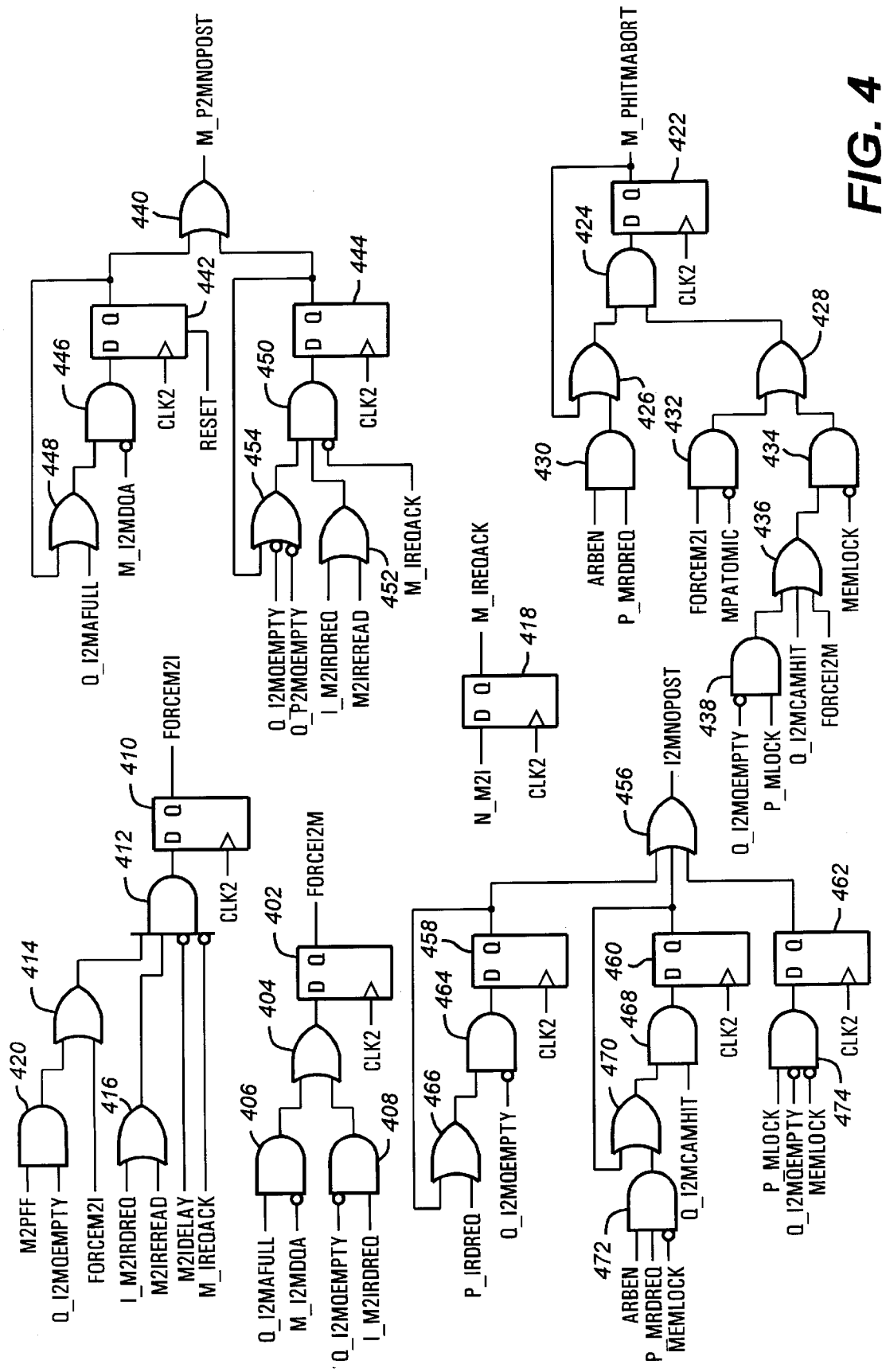
FIG. 4 is a logic diagram of circuitry for asserting signals indicating various override conditions in the arbitration scheme.

The signal FORCEI2M is provided by a D flip flop 402 in FIG. 4, to which reference is now made. The signal FORCEI2M is asserted high to force an I2M write request higher in priority than the M2P read request. The D input of the D flip flop 402 is connected to the output of an OR gate 404, whose inputs are connected to the outputs of AND gates 406 and 408. The inputs of the AND gate 406 receive a signal Q_I2MAFULL and the inverted state of a signal M_I2MDQA. The signal Q_I2MAFULL indicates that the I2M queue is full. The signal M_I2MDQA indicates that an I2M write has initiated and a pointer pointing to the I2M queue has been incremented to the next position in the I2M queue. When the signal M_I2MDQA is asserted, that indicates the I2M queue cannot be full. The AND gate 408 receives a signal I_M2IRDREQ, provided by the ICON 232 to indicate if an M2I read request is asserted, and the inverted state of the signal Q_I2MQEMPTY. Thus, if the I2M queue is full and an I2M request is not currently being serviced, or if an M2I read request is generated while the I2M queue is not empty, the signal FORCEI2M is asserted high to keep the signal N_M2P in the deasserted state.

Referring back to FIG. 3A, the NAND gate 316 receives the signal P_MLOCK, the inverted state of the signal Q_I2MQEMPTY, and the inverted state of the signal MEMLOCK. The NAND gate 316 ensures that if a processor initiated locked cycle is not currently pending, that is, the signal MEMLOCK is deasserted low, any locked request by the microprocessor 200 is not recognized until the I2M queue is cleared. Since a locked M2P read request cannot be pushed down in priority by pending I2M or M2I requests, the processor initiated locked cycle is held off to ensure that pending PCI requests are first serviced.

The inputs of the NAND gate 318 receives a signal FORCEM2I and the inverted state of a signal MPATOMIC. The signal MPATOMIC is asserted high in what are referred to as "pseudo locked" cycles. Such cycles include writeback cycles and read and write allocate cycles with replacement writebacks. A read allocate cycle is executed when a read of the L2 cache memory 208 results in a miss. The missed line is read from the main memory 214 and allocated into the L2 cache memory 208. Similarly, a write allocate cycle occurs when a write to the L2 cache memory 208 results in a miss. If an allocated line in the L2 cache memory 208 is in the modified state, then a replacement writeback cycle is executed to write back the modified line to the main memory 214 before replacing the L2 cache lines. Thus, if the signal MPATOMIC is asserted, the arbiter does not arbitrate for PCI cycles. Otherwise, if the signal MPATOMIC is deasserted, assertion of the signal FORCEM2I causes the M2I read request to be prioritized higher than the M2P read request.

Referring again to FIG. 4, the signal FORCEM2I is provided by a D flip flop 410, which is clocked by the signal CLK2. The D input of the D flip flop 410 is connected to the output of an AND gate 412, whose inputs are connected to the output of an OR gate 414 and the output of an OR gate 416. The inputs of the AND gate 412 also receive the inverted state of a signal M2IDELAY and the inverted state of a signal M_IREQACK. Asserting the signal M2IDELAY holds off the M2I read request, and the signal M_IREQACK is asserted high to acknowledge that an M2I read request has been granted. The signal M_IREQACK is provided by a D flip flop 418, which is clocked by the signal CLK2. The D input of the D flip flop 418 receives the signal N_M2I.

The inputs of the OR gate 416 receive signals I_M2IRDREQ, which indicates an M2I read request, and a signal M2IREREAD, which is asserted to regenerate an M2I read request after completion of a writeback cycle from either the L1 cache or the L2 cache memory 208 which is generated in response to an M2I snoop request. The first input of the OR gate 414 receives the signal FORCEM2I and the second input is connected to the output of an AND gate 420. The inputs of the AND gate 420 receives signals M2PFF and Q_I2MQEMPTY. The signal M2PFF is provided by a D flip flop 330 in FIG. 3B, which is clocked by the signal CLK2. The D input of the D flip flop 330 is connected to the output of a multiplexer 332. The 0 input of the multiplexer 332 is connected to the signal M2PFF and the 1 input is connected to the signal N_M2P. The multiplexer 332 is selected by the arbitration enable signal ARBEN. If an M2P read request wins during an arbitration cycle, the signal M2PFF is latched high by the D flip flop 330 when the signal ARBEN is deasserted low. Thus, when an M2P read request was granted in the previous arbitration cycle, the I2M queue is not empty, and an M2I read request is asserted, the signal FORCEM2I is asserted high to force the granting of all the pending I2M write requests and the M2I read request before another M2P read request can be granted. Once the pending M2I read request is granted, the signal M_IREQACK is asserted high to drive the signal FORCEM2I back low.

Referring again to FIG. 4, the signal M_PHITMABORT, which also disables the granting of an M2P read request, is provided by a D flip flop 422. The D flip flop 422 is clocked by the signal CLK2 and its D input is connected to the output of an AND gate 424. The inputs of the AND gate 424 are connected to the output of an OR gate 426 and the output of an OR gate 428. The first input of the OR gate 426 is connected to the signal M_PHITMABORT, and its second input is connected to the output of an AND gate 430. The inputs of the AND gate 430 receive the signals ARBEN and P_MRDREQ. The inputs of the OR gate 428 are connected to the output of an AND gate 432 and the output of an AND gate 434. The inputs of the AND gate 432 receive signals FORCEM2I and the inverted state of the signal MPATOMIC. The first input of the AND gate 434 is connected to the output of an OR gate 436, and its second input receives the inverted state of the signal MEMLOCK. Two inputs of the OR gate 436 receive signals Q_I2MCAMHIT and FORCEI2M, and the last input is connected to the output of an AND gate 438. The inputs of the AND gate 438 receive the signal P_MLOCK and the inverted state of the signal Q_I2MQEMPTY. Thus, if the signal M_PHITMABORT is already asserted high, or if an M2P read request is asserted, one of the following conditions causes the signal M_PHITMABORT to be asserted or maintained at a high state, thereby disabling the granting of an M2P read request: the signal FORCEM2I is asserted high and a "pseudo locked" processor cycle is not pending; a locked M2P request is not currently pending and the signal FORCEI2M is asserted high, the signal Q_I2MCAMHIT is asserted high, or a processor locked cycle is generated, but the I2M queue is not empty. It is noted that the above conditions are already provided as inputs to the AND gate 312 to disable the signal N_M2P. The purpose of the signal M_PHITMABORT is to extend the disabling of the signal N_M2P by one CLK2 cycle. The signal M_PHITMABORT is also provided to the PCON 230. When the signal M_PHITMABORT is asserted high, the PCON 230 responds by asserting the processor back off signal BOFF* low. Assertion of the signal BOFF* causes the microprocessor 200 to abort all outstanding bus cycles, which in this case is the M2P read cycle. On the next bus clock, the microprocessor 200 floats most of its output pins. When the signal BOFF* is negated high by the CMC 210, the microprocessor 200 restarts the aborted M2P read cycle. Thus, any override of the M2P read request is accompanied by a back off request BOFF* to the microprocessor 200.

Referring back to FIG. 3A, the signal N_I2M is provided by an AND gate 338. The AND gate 338 receives the arbitration enable signal ARBEN, the inverted state of the signal RFSHREQ2, the signal Q_P2MQEMPTY, a signal I2MREQ, the inverted state of the signal MEMLOCK, and the inverted state of the signal MPATOMIC. The last input of the AND gate 338 is connected to the output of an OR gate 340, whose inputs receive the signals FORCEI2M, P_MLOCK, Q_I2MCAMHIT, and the inverted state of the signal P_MRDREQ. Thus, the signal N_I2M is asserted high if an I2M write request is asserted as indicated by the signal I2MREQ, a second refresh cycle is not pending, the P2M queue is empty, a locked or pseudo locked M2P read request is not pending, and one of the following conditions is true: the signal FORCEI2M is asserted high, the signal P_MLOCK is asserted high to indicate that a locked cycle has been generated on the processor bus 202, the signal Q_I2MCAMHIT is asserted high to indicate that an M2P read request has hit an I2M write request in the I2M queue, or the signal P_MRDREQ is deasserted low to indicate no pending M2P read request.

The signal N_M2I is provided by an AND gate 342. The inputs of the AND gate 342 receive the signal ARBEN, the inverted state of the signal RFSHREQ2, the signal Q_P2MQEMPTY, the inverted state of the signal MPATOMIC, the signal Q_I2MQEMPTY, and the inverted state of the signal M2IDELAY. The inputs of the AND gate 342 are also connected to the output of an OR gate 344 and the output of an OR gate 346. The inputs of the OR gate 344 receive the signal FORCEM2I and the inverted state of the signal P_MRDREQ. The first input of the OR gate 346 receives the signal M2IREREAD and the second input is connected to the output of an AND gate 348. The inputs of the AND gate 348 receive signals M2IBLINDRD and I_M2IRDREQ. The M2I read request is not granted while a second refresh request is pending, the P2M queue is not empty, the I2M queue is not empty, an M2P pseudo locked request is pending, or the M2I read request is held off by the signal M2IDELAY. However, if the above conditions are not true, then the signal N_M2I is asserted high if the following is true: an M2I read request is asserted as indicated by the signal M2IREREAD asserted high or the signals I_M2IRDREQ and M2IBLINDRD both asserted high; and the signal FORCEM2I is asserted high or the signal P_MRDREQ is deasserted low to indicate that an M2P read request is not pending.

To prevent P2M write requests, which have the highest priority other than the second refresh request, from potentially starving the PCI bus 98, certain conditions will stop further postings of P2M writes to the P2M queue. To this end, a signal M_P2MNOPOST is provided by the MCON 234 to the PCON 230. Assertion of the signal M_P2MNOPOST prevents further P2M write requests from entering the P2M queue. This allows the P2M queue to clear, thereby allowing PCI write and read requests to proceed. As noted earlier, the signal M_P2MNOPOST does not prevent writeback requests from being posted in the P2M queue, as those cycles may be needed by an M2I read request. Referring again to FIG. 4, the signal M_P2MNOPOST is provided by an OR gate 440, whose inputs are connected to the outputs of D flip flops 442 and 444. Both D flip flops 442 and 444 are clocked by the signal CLK2, and the D flip flop 442 is reset low by the signal RESET. The D input of the D flip flop 442 is connected to the output of an AND gate 446, whose first input receives the inverted state of the signal M_I2MDQA and whose second input is connected to the output of an OR gate 448. The first input of the OR gate 448 receives the signal Q_I2MAFULL, which is asserted high when the I2M queue is full. The second input of the OR gate 448 is connected back to the output of the D flip flop 442. Thus, further P2M write requests are blocked if the I2M queue is full. However, if the I2M write request is currently being serviced, as indicated by the signal M_I2MDQA being asserted high, the signal M_P2MNOPOST is kept low. The signal M_I2MDQA also serves to reset the D flip flop 442 when an I2M write request has been serviced in response to the I2M queue being full.

The input of the D flip flop 444 is connected to the output of an AND gate 450, whose first input receives the inverted state of the signal M_IREQACK, and whose other inputs are connected to the outputs of OR gates 452 and 454. The inputs of the OR gate 452 receive signals I_M2IRDREQ and M2IREREAD. The first input of the OR gate 454 is connected to the output of the D flip flop 444, and the second and third inputs of the OR gate 454 receive the inverted state of the signal Q_I2MQEMPTY and the inverted state of the signal Q_P2MQEMPTY. Thus, when an M2I read is asserted, the P2M queue and the I2M queue are cleared as soon as possible by asserting M_P2MNOPOST to allow the M2I read to be serviced in a reasonable amount of time. Once the M2I read request is granted, the signal M_IREQACK is asserted high to clear the D flip flop 444.

Certain conditions also exist to prevent the queuing of I2M write requests in the I2M queue. I2M writes are held off if a signal I2MNOPOST is asserted high. The signal I2MNOPOST is provided by a 3-input OR gate 456, whose inputs are connected to the outputs of D flip flops 458, 460 and 462. All three D flip flops 458, 460 and 462 are clocked by the signal CLK2. The D input of the D flip flop 458 is connected to the output of an AND gate 464, whose first input receives the inverted state of the signal Q_I2MQEMPTY, and whose second input is connected to the output of an OR gate 466. The first input of the OR gate 466 receives a signal P_IRDREQ, which is provided by the PCON 230 to the ICON 232 to indicate an I/O read request from the microprocessor 200 to the PCI bus 98. The second input of the OR gate 466 is connected to the output of the D flip flop 458. Thus, if a processor-to-PCI read request is pending in the P2I queue, and an I2M write request is pending, then further posting of I2M write requests to the I2M queue is prohibited. This allows an I/O read request from the microprocessor 200 to be completed in a reasonable amount of time.

The D input of the D flip flop 460 is connected to the output of an AND gate 468, whose first input receives the signal Q_I2MCAMHIT, and whose second input is connected to the output of an OR gate 470. The first input of the OR gate 470 is connected to the output of an AND gate 472, and a second input of the OR gate 470 is connected to the output of the D flip flop 460. The inputs of the AND gate 472 receive the signal ARBEN, the signal P_MRDREQ, and the inverted state of the signal MEMLOCK. Thus, if an unlocked memory-to-processor read request, indicated by the signal MEMLOCK being deasserted, results in a hit to an entry in the I2M queue, as indicated by the assertion of the signal Q_I2MCAMHIT, further posting of I2M write requests is prevented. It is noted that a locked M2P read cycle accepted by the MCON 234 will never interfere with I2M write requests, as the I2M queue must be emptied before the signal MEMLOCK is allowed to be asserted. Thus, if the address of an M2P read request is in the I2M queue, and the signal MEMLOCK is not asserted, I2M write requests are forced higher in priority than M2P read requests. This allows the I2M write request containing the matching address to be written to the main memory 214 first before the M2P read request is allowed to proceed. However, before the matching I2M write can be serviced, all the I2M write requests higher up in the I2M queue must first be serviced. Preventing further posting of I2M write requests ensures that the M2P read request can be serviced as soon as possible after the I2M write request containing the matching address has been serviced. Although M2P read requests are generally higher in priority than I2M write requests, it must be remembered that if I2M writes are allowed to be posted to the I2M queue, and an M2I read is subsequently asserted, then the signal FORCEI2M is asserted high to override the M2P request.

The D input of the D flip flop 462 is connected to the output of an AND gate 474, whose inputs receive the signal P_MLOCK, the inverted state of the signal Q_I2MQEMPTY, and the inverted state of the signal MEMLOCK. As discussed above, processor locked cycles are not granted by the CMC 210 until the I2M queue has cleared. Thus, to prevent I2M write requests from indefinitely postponing processor locked requests, the signal I2MNOPOST is asserted high to allow the I2M queue to empty.

Referring now to FIGS. 6A, 6B, 6C and 6D are a state machine I2MST and related logic for controlling I2M write requests are shown. On system reset, the state machine I2MST enters state A, where it remains until one of the following two expressions is true. The first expression is:

Q_I2MWRREQ•!MEMLOCK•Q_I2MSNOOP•P_SNPDONE•(Q_I2MNLINE+!SNPVALID)
The second expression is:
Q_I2MWRREQ•!MEMLOCK•(!Q_I2MSNOOP+!Q_I2MNLINE•SNPVALID)
Assertion of the signal Q_I2MWRREQ indicates that an I2M write request is currently in the I2M queue. The signal MEMLOCK, when asserted high, indicates that the main memory 214 is locked by a processor cycle. The signal Q_I2MSNOOP is asserted high if the address provided with the current I2M write request is a cacheable address, either the L1 cache and the microprocessor 200 or the L2 cache memory 208 is enabled, and either the L1 cache or the L2 cache is configured in the writeback mode. The signal Q_I2MSNOOP is actually a queued version of a signal S_SNOOP, stored in the I2M queue along with the I2M write request to indicate if a snoop cycle is required on the processor bus 202.

In the preferred embodiment, before an I2M write request is forwarded to the arbiter (as the signal I2MREQ), the PCI address associated with the I2M write request is forwarded to the processor bus 202 as a snoop cycle to determine if the address is stored in either the L1 cache of the microprocessor 200 or the L2 cache memory 208. If a hit occurs, then the cache line containing the snoop address is invalidated in either the L1 cache or L2 cache memory 208, or both. Once a snoop cycle has been performed for an I2M write, subsequent I2M write requests to addresses on the same cache line need not be snooped. This technique is more fully explained and detailed in U.S. Pat. No. 5,325,503, which is hereby incorporated by reference. The snooped cache line, also referred to as the snoop filter line buffer, is represented as address signals M_SNPA[27:4]. Once a snoop cycle has been executed in response to an I2M write request, a signal SNPVALID is asserted high. The signal SNPVALID is provided by a D flip flop 602, which is clocked by the signal CLK2. If the signal RESET is asserted high, the D flip flop 602 is cleared. The D input of the D flip flop 602 is connected to the output of an AND gate 604, whose first input receives a snoop filter enable signal S_SNPFLTEN, which corresponds to bit 3 of a configuration register. When set high, the signal S_SNPFLTEN enables the snoop filter line buffer; otherwise, if the signal S_SNPFLTEN is set low, then all I2M write requests must be snooped.

The second input of the AND gate 604 is connected to the output of an OR gate 606, whose first input receives a signal I2MSNPREQ, and whose second input is connected to the output of an AND gate 606. The signal I2MSNPREQ is provided by the state machine I2MST for requesting a snoop cycle. The inputs of the AND gate 606 receive the signal SNPVALID, the inverted state of a signal CPUFTRHIT, and the inverted state of a signal M2ISNPREQ. The signal M2ISNPREQ is asserted high to request snoop cycles during M2I read cycles. The signals I2MSNPREQ and M2ISNPREQ are provided to the inputs of an OR gate 612, which provides the signal SNPREQ provided by the MCON 234 to the PCON 230 for requesting a snoop cycle.

When the signal M2ISNPREQ is asserted high, the signal SNPVALID is deasserted low to indicate that the current cache line represented by the signals M_SNPA[27:4] is not valid for an I2M write request. The signal CPUFTRHIT is asserted high if the address presented on the processor address bus PA during a processor-to-memory write cycle or a memory-to-processor read cycle matches the address signals M_SNPA[27:4]. This indicates that data in the snooped cache line may potentially have been modified by the microprocessor 200; as a result, the signal SNPVALID is deasserted low. It is noted that if a 64-bit microprocessor 200 is used, that is, the cache line width is 32 bytes, the processor address bits PA[27:5] are compared to the address signals M_SNPA[27:5]. However, if a 32-bit microprocessor 200 is used, that is, the cache line width is 16 bytes, processor address bits PA[27:4] are compared to address bits M_SNPA[27:4]. The signal Q_I2MNLINE is asserted high if the address associated with the current I2M write request is in a cache line different from the cache line associated with the snooped address M_SNPA[27:4].

The signal P_SNPDONE is provided by a D flip flop 608 located in the PCON 230, which is clocked by the signal CLK2. The D input of the D flip flop 608 is connected to the output of an AND gate 610, whose inputs receive signals D_L1SNP_DONE and D_L2SNP_DONE. The default states of both signals D_L1SNP_DONE and D_L2SNP_DONE are high. If a snoop request is asserted in response to either an M2I read request or an I2M read request, the signals D_L1SNP_DONE and D_L2SNP_DONE are deasserted low. At the same time, the PCON 230 generates a snoop cycle on the processor bus 202 to the microprocessor 200. The PCON 230 also compares the snoop address on the processor address bus PA with the selected entries of the tag RAMS 236 and 238. If the snoop cycle hits a modified line in the L1 cache, the microprocessor 200 asserts its HITM* output to indicate that a writeback cycle will soon follow. The signal D_L1SN_DONE is maintained low. After the modified line has been written back by the microprocessor 200, the signal D_LISNP_DONE is asserted high. However, if the signal HITM* is not sampled asserted in response to the snoop cycle, the signal D_LISNP_DONE is asserted high.

The signal D_L2SNP_DONE is asserted high if the snoop cycle misses in the L2 cache memory 208, or if the snoop address hits a shared line in the L2 cache memory 208. In the case of the hit to the shared line, the matching line is invalidated. However, if a hit occurs to a modified line in the L2 cache memory 208, a writeback cycle is performed to the main memory 214, during which time the signal D_L2SNP_DONE is maintained low. After completion of the writeback cycle, the signal D_L2SNP_DONE is asserted high.

Thus, the state machine I2MST transitions from state A to state B if a snoop cycle is needed for the current I2M write request. This condition is true if the signal Q_I2MNL1NE is asserted high or the signal SNPVALID is deasserted low. In the transition from state A to state B, the signal I2MSNPREQ is asserted high. However, if the current I2M write request is to a memory address that has already been snooped previously, as indicated by the signal Q_I2MNL1NE deasserted low and the signal SNPVALID asserted high, the state machine I2MST transitions from state A to state C. In the transition, the signal I2MREQ, which is provided to the AND gate 338 to control the signal N_I2M, is asserted high.

The state machine I2MST remains in state B until the signal P_SNPDONE is asserted high to indicate completion of the snoop cycle. When that occurs, the state machine I2MST transitions from state B to state C, where control remains until the signal M_I2MDQA is asserted high. In state C, the signal I2MREQ is asserted high. When the signal M_I2MDQA is asserted high to indicate that an I2M write request has been serviced, the state machine I2MST transitions from state C back to state A.

Figure 7A:
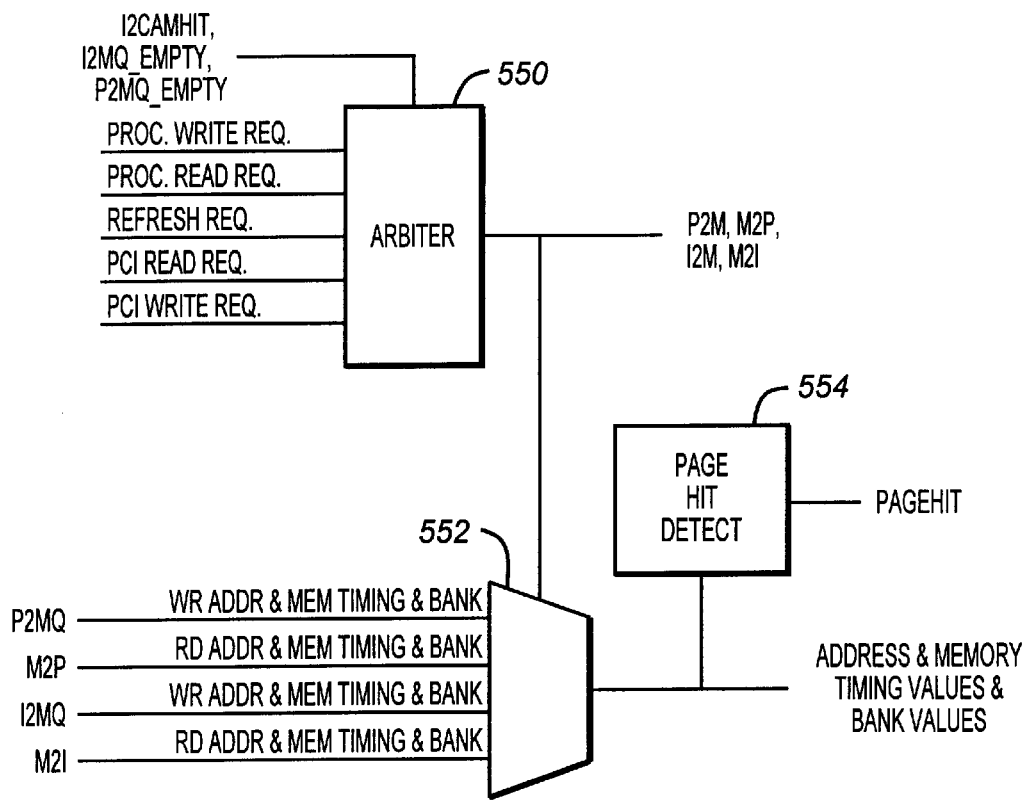
FIGS. 7A and 7B are block diagrams of portions of the memory controller of FIG. 2B.

Proceeding then to FIG. 7A, the use of the addresses, byte enables and timing values are shown as being provided to a portion of the MCON block 234. The processor write request, processor read request, refresher quest, PCI read request and PCI write request signals are inputs to an arbiter 550 along with signals referred to as I2CAMHIT, I2MQ__EMPTY and P2MQ__EMPTY. The various request signals are an indication that operations are pending for the memory controller to operate on from the indicated sources of the indicated type. Development of these signals is not fully described but can be readily developed by one skilled in the art. The outputs of the arbiter 550 are the P2M, M2P, I2M and M2I signals to indicate which source and direction of operation has occurred, that is P2M for a processor to memory write, M2P for a processor to memory read, I2M for a PCI to memory write operation and M2I for a PCI read operations. These four signals are provided as the select signals to a four input multiplexor 552 which receives the particular read or write addresses, the byte enables, the memory timing values and the bank indications for the particular source. The P2M queue 246 provides write addresses, byte enables, memory timings and bank information from the queue 246 for processor to memory write operations, while the read addresses, byte enables, memory timings and bank information are provided directly for processor reads in the M2P case. Similarly, the I2M queue 248 provides write addresses, byte enables, memory timings and bank information from the I2M queue 248, while the read addressing information is provided directly from the ICON block 232 to the MCON block 234. The output of the multiplexor 552 is the particular address value, the byte enables, the bank value to indicate which particular bank and the memory timing values for the particular memory operation to be performed by the memory controller 210 to access the necessary memory location for either a read or a write as appropriate. It is also noted that a page hit detector 554 is connected to the output of the multiplexor 552 to provide a PAGEHIT signal to allow the memory controller 210 to determine whether a page hit has occurred, so that it can operate the DRAM devices in the desired page mode operation for best performance.

Figure 7B:
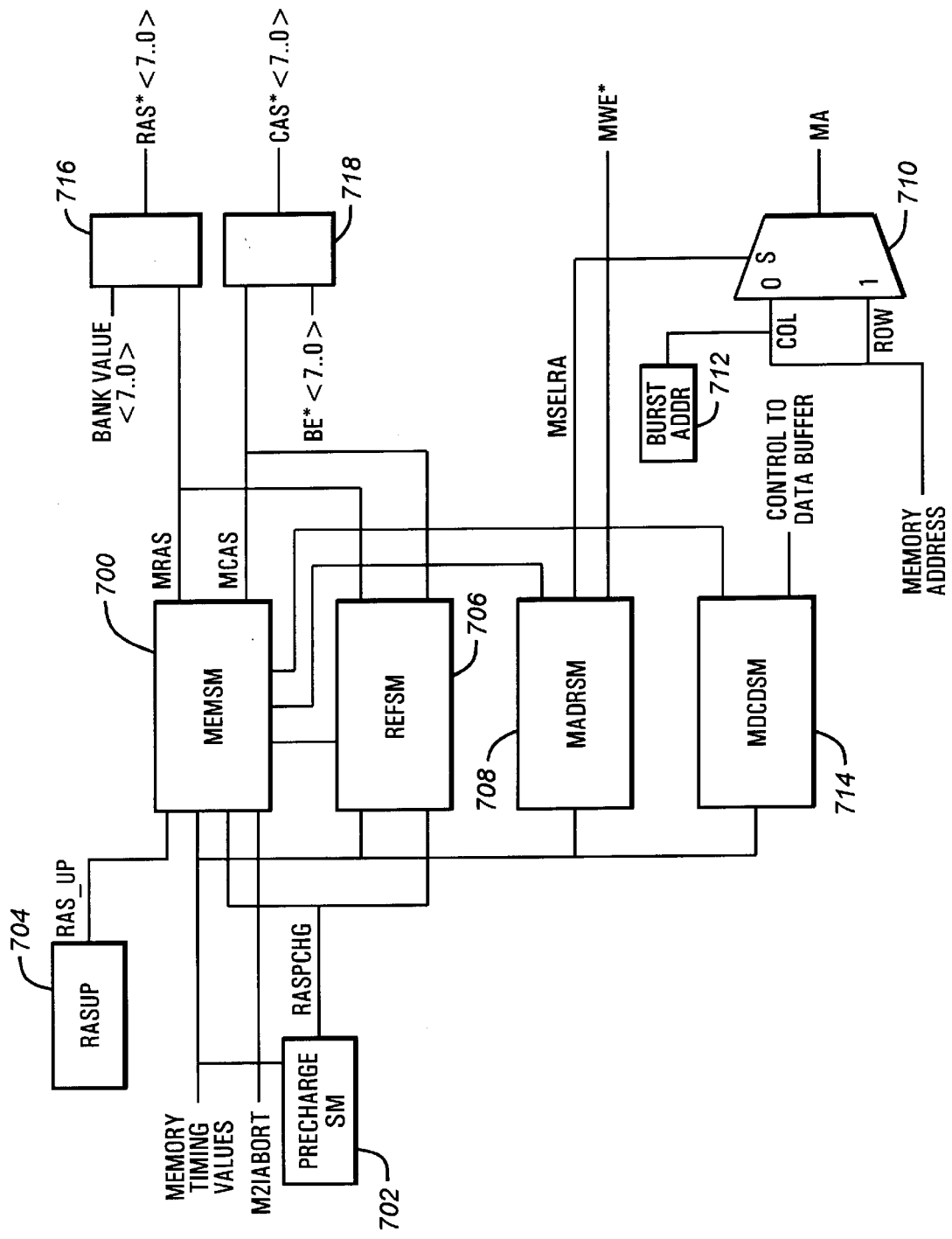

Proceeding then to FIG. 7B, blocks representing various state machines and other logic utilized in the MCON block 234 are shown. A number of state machines provide the actual information and control functions and are interlocked. The primary state machine is the MEMSM or memory state machine 700. The memory state machine 700 receives the memory timing values from the multiplexor 552 and the M2IABORT signal from the ICON block 232. A precharge state machine 702 is provided to provide a signal referred to as RASPCHG or RAS precharge to indicate that the precharge time for the particular memory bank is completed if page mode operation is not occurring. The RASPCHG signal is provided to the memory state machine 700. Additionally, RASUP or RAS up logic 704 provides a RAS_UP signal which is utilized by the memory state machine 700 to determine whether to leave the RAS* or row address strobe signal high or low when no memory cycles are pending, thus providing a prediction whether the next operation will be a page hit or page miss to thereby improve performance. Detailed operation of this logic will be described below.

A refresh state machine 706 is provided to control refresh operations but will not be described in detail in this description because its operation is relatively conventional and is omitted for clarity. A memory address state machine 708 receives the timing values from the multiplexor 552, as well as the basic clock signal of the system and provides interlock signals to the memory state machine 700, the MSELRA or memory select row address signal and the MWE* or memory write enable signal. The MSELRA signal is provided to the select input of a 2:1 multiplexor 710 which receives at its inputs the memory addresses appropriately connected to provide row and column addresses based on the selection input. A burst address block 712 is provided and connected to the column addresses to simplify burst operation. The outputs of the multiplexor 710 are the memory addresses provided to the memory array 214 over the memory address bus MA for the particular operation. The MWE* signal is similarly the memory write enable signal as provided to the main memory array 214. A memory data control state machine 714 is provided. It receives certain of the memory timing values and provides interlock signals to the memory state machine 700 and controls the operation of pertinent portions of the data buffers 212 and 213.

The memory state machine 700 provides the MRAS or master RAS and MCAS or master CAS signals. The MRAS signal is combined with the bank value signals for the particular memory operation to provide the RAS*<7:0> signals which are provided to the particular banks. If the bank value indicates that this is the particular bank value for the operation, then the RAS logic 716 directs the MRAS signal to that particular bank in an inverted form. If the bank value is not the one particularly being addressed, then the RAS* signal for that particular bank is held high to allow the memory devices to be fully precharged. The MCAS signal is provided to CAS logic 718 which also receives the BE*<7:0> signals for the preferred 64 bit width. These signals provide the eight byte lanes of information that are encoded with the MCAS signal to produce the CAS*<7:0> signals which are used to enable the particular memory devices of the bank indicated by the RAS*<7. . . 0> signals. If a particular byte enable is not activated, then its related CAS* signal is not activated, and therefore the memory device is not selected as it does not receive a column address. This allows the use of a single MWE* signal, with the CAS* signal providing the byte lane encoding.

The queues 242, 246 and 248 are organized as a series of registers of the appropriate width. Particular registers in each queue are selected based on three particular counter values associated with each queue. The three counters are the read location counter, the write location counter and the data contents counter. The read location counter is utilized to determine the particular location of the four or eight registers from which the read data for the next cycle is to be obtained and provided to the particular block. The write location counter is utilized to indicate the particular register into which data is to be written in the next operation. The read and write location counters increment on each read and write operation, respectively, and thus operate in a circular fashion. The data contents counter is utilized to indicate whether there is actually data in the queue. The data contents counter is an up/down counter. The data contents counter counts up on a write operation to the queue and decrements on read operations. If the data contents counter indicates that the queue is full by being at a maximum value, then data is not written into the queue until data has been removed from the queue. These counters are conventional logic and are not shown for simplicity and clarity. I2MQ__EMPTY and P2MQ__EMPTY signals thus correspond to the data contents counters being at a zero value.

Figure 8:
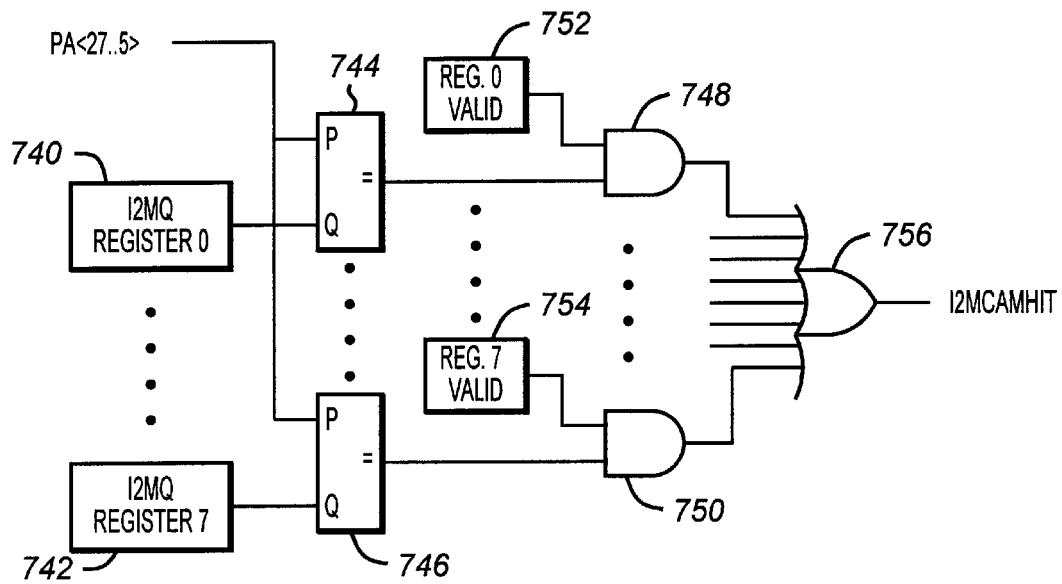
FIG. 8 is a block diagram of the CAM hit detection logic of the memory controller of FIG. 2B.

Because of the length of the I2M queue 248, it is organized as a content addressable memory or CAM. I2M queue registers 740 and 742 are shown in FIG. 8, with many omitted for simplicity. The output of the particular register 740, 742 is not only provided to the MCON block 234 via a multiplexer but is also provided to an associated comparator 744 and 746. The second input of the comparator 744 and 746 receives the processor address being provided on the processor address bus PA. The comparators 744 and 746 have equal outputs so that if the address being provided directly on the processor address bus PA is equal to one of the addresses contained in the I2M queue 248, then the particular comparator provides its equal signal true. The equal signal output goes to one input of an AND gate 748 and 750. The second input to the AND gate 740 and 750 is provided by a valid bit register 752 and 754. If data is not contained in the particular register 740, 742 in the I2M queue 248, then the valid bit register is set to 0, whereas if data is present, then the bit is set to 1. These valid bit registers are set when data is written into the I2M queue 248 and cleared when data is read out of the queue 248. In this manner, if the register is valid and the comparator determines that there is an equality, the output of the particular AND gate is set to a one value to indicate that a hit has occurred. The outputs of the AND gates 748 to 750 are provided to an eight input OR gate 756 whose output is the I2MCAMHIT signal, which is provided to indicate that the particular read address being requested by the processor is actually present in the I2M queue 248 as a write operation from the PCI bus 98, and therefore the memory read request from the processor 200 cannot occur until the particular location has been flushed out of the I2M queue 248. Operation of this delay is seen in the arbiter 550 as described below.

In the preferred embodiment, there are five possible requests for the main memory 214: a processor-to-memory write (P2M), a memory-to-processor read (P), a PCI-to-memory write (I2M), a memory-to-PCI read (M2I), and refresh. A P2M write refers to a write to the memory 214 and a M2P read refers to a read of the memory 214, both initiated by the microprocessor 200. An I2M write refers to a write to the memory 214 and a M2I read refers to a read of the memory 214, both initiated by a PCI bus master. All memory requests from EISA bus masters are passed through the PCI-EISA bridge 130, which includes the necessary logic to be a bus master on the PCI bus 98. Thus, any EISA originated memory request is effectively a memory request asserted by the PCI-EISA bridge 130.

Generally, the priority of the memory requests are as follows, with some exceptions: (1) second refresh request; (2) P2M write request; (3) M2P read request; (4) I2M write request; (5) M2I read request; and (6) first refresh request. The second refresh request indicates that two refreshes are outstanding. When that occurs, the memory controller 234 gives both outstanding refresh requests the highest priority, executing both refresh cycles. The P2M write request is always higher in priority than other memory requests except the second refresh. However, if the I2M queue 248 is full or the I2M queue 248 is not empty and a PCI bus 98 read is outstanding, a signal M_P2M_NOPOST is asserted to prevent further queuing of P2M write requests until a PCI write operation is completed. This allows the P2M queue to clear out, thereby allowing requests from the PCI bus 98 to be serviced. However, assertion of the signal M_P2M_NOPOST does not prevent writeback cycles from being queued, as the writeback may be needed by the PCI memory request.

The M2P read request is always lower in priority than the P2M write request, but it is usually higher in priority than I2M write and M2I read requests. The operation can only occur when the P2M queue 246 is empty. However, an unlocked M2P read request is forced lower in priority than an I2M write request if the M2P read is to the same address as an I2M write pending in the I2M queue. When this occurs, the M2P request remains lower in priority than I2M requests until the I2M write request having the matching address is written to the main memory 214. A M2P read request is also forced lower in priority than an I2M write request if the I2M queue is full. Additionally, if an M2I read request is asserted while an I2M write request is pending, the I2M write request is forced higher in priority than the M2P read request to allow the I2M queue to clear, thereby allowing the M2I request to proceed. Further, an M2I read request is forced higher in priority than the M2P read request if the M2I read has been waiting for the M2P request to negate for more than one arbitration cycle.

The I2M write request is always lower in priority than the second refresh request, the P2M write request, and it is generally lower in priority than the M2P read request with the exceptions noted above. The I2M write operation can only occur when the P2M queue 246 is empty. The I2M write request is always higher in priority than the M2I read request. The I2M write request is held off if the processor is performing a locked access of the main memory 214. Thus, for a locked processor cycle, the exceptions discussed above do not apply to override the higher priority of M2P read requests over I2M or M2I requests.

A locked or atomic access of the main memory 214 is indicated by a signal LOCK* driven by the microprocessor 200. A locked cycle allows the microprocessor 200 to read an address location in the main memory 214 and be assured that the accessed location is not changed by another bus master before the microprocessor 200 writes back to the same memory location. These type cycles are referred to as read modify write cycles. Locked cycles are also generated during other bus transfers, such as during execution of the XCHG (exchange) instruction when one of its operands is memory-based, when updating a segment or page table entry, and when executing interrupt acknowledge cycles.

The M2I read request is always lower in priority than the second refresh request, the P2M write request, and the I2M write request. However, it is higher in priority than the unlocked M2P read request in the instance noted above. The M2I read operation can only occur when the P2M queue 246 is empty.

Finally, the first refresh request is always lower in priority than any of the other requests. However, as noted above, when the second refresh request is asserted, both the first and second refresh requests are executed regardless of whether other requests are pending.

Figure 9:
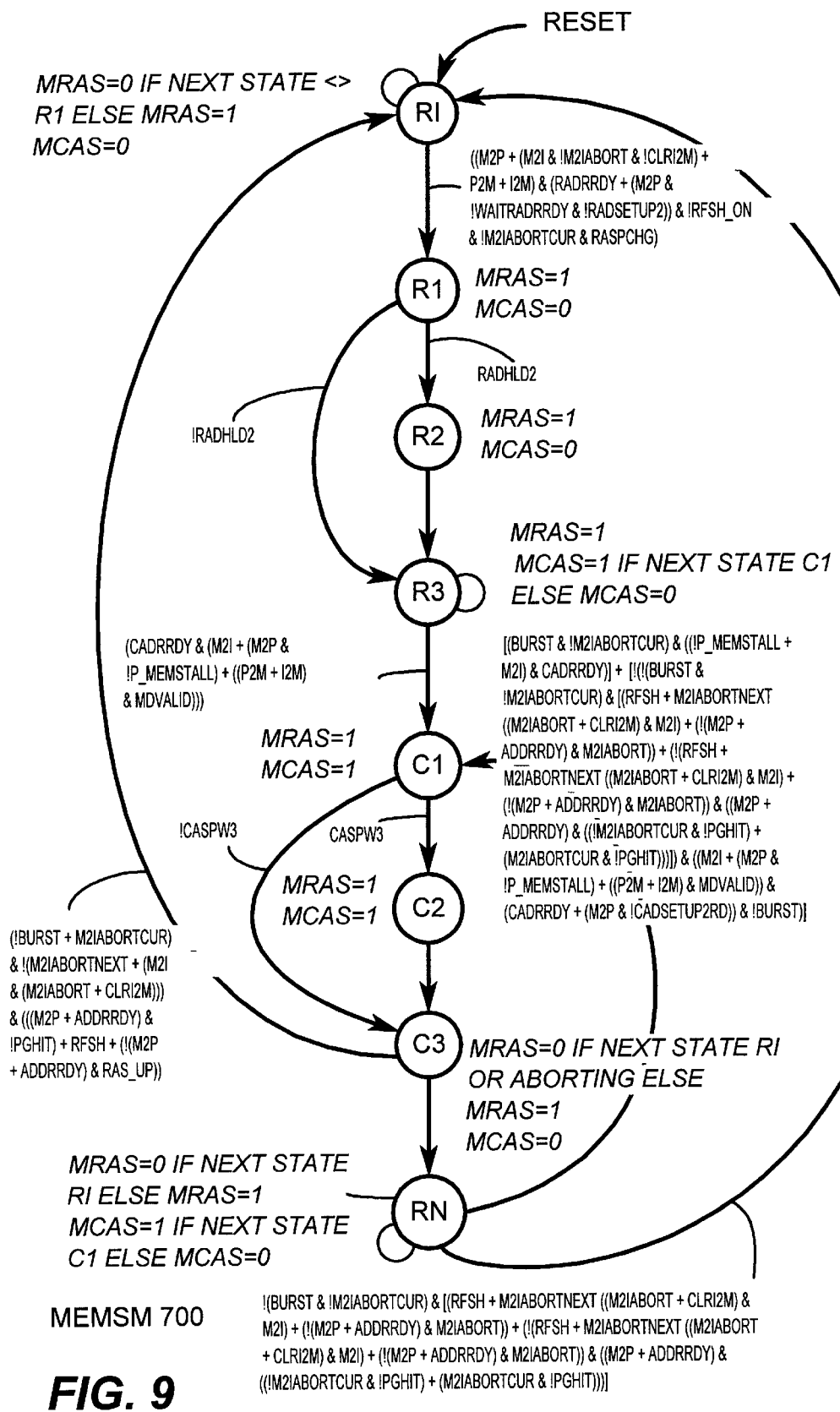
FIGS. 9, 10, 11, 12, 13 and 14 are state machine diagrams for operations of circuitry of various portions of the memory controller of FIG. 2B.

Referring now to FIG. 9 the memory state machine 700 is shown in detail. Indications in italics next to a particular state bubble indicate the value of various output signals, developed by the state machine. In this case the MRAS and MCAS signals. The phrases adjacent to an arrow going from one bubble to an other are the logical conditions on which that path is taken. If a path does not have an adjacent logical condition, that path is taken in all other cases. Transitions are made on the rising edge of the processor clock signal. Upon reset of the computer, operation of the state machine 700 transfers to the RI or RAS idle state. In this state the MRAS signal is not asserted if the next state is not state R1. If the next state is R1, then the MRAS signal is set to the value 1 or asserted so that the row address strobe signal is provided. The MCAS signal is negated to a zero level. Control proceeds from state RI to state R1 if the M2P condition is true so that a processor read operation is occurring, if a PCI read operation is occurring (M2I) which has not been aborted (!M2IABORT) and is not being cleared (!CLRI2M), or if a write operation from the processor or the PCI bus is occurring; the row address ready signal (RADRRDY) is true, which indicates that the row address set up time to the RAS signal has been met as indicated by the memory address state machine 708, or, if in a processor read case there is no wait signal indicated as would be appropriate if an aborted memory to PCI read ahead is completing (WAITRADRRDY) and the row address set up time two (RADSETUP2) signal is not activated which indicates that relatively fast memory is present; a refresh cycle is not occurring (RFSH_ON); the current read cycle to the PCI bus 98 is not being aborted (M2IABORTCUR); and the precharge period has completed for as indicated by the RASPCHG signal. The M2IABORT signal is provided by the ICON block 232 as described above. The M2IABORTCUR signal indicates that the cycle currently being performed by the MCON block 234 is to be aborted or terminated as soon as possible. The M2IABORTNEXT signal indicates that the next M2I cycle which is pending is to be aborted, which occurs by simply skipping the cycle. The development of the CLRI2M signal is detailed below, but briefly indicates that a snoop read hit to a modified location has occurred, so that the I2M queue 264 must be flushed and the read cycle reexecuted. Therefore, if a memory cycle is indicated, the row address set up time has been met, and the device is precharged, control proceeds in state RI to state R1. In all other cases control remains at state RI.

In state R1 the MRAS signal is set to 1 or high and true, and the MCAS signal is set low to indicate that this is a RAS only portion of the cycle. Control proceeds from state R1 to state R2 if the RADHLD2 signal is true, which indicates that two clock periods of hold time are required and therefore the intermediate R2 state is required. If the RADHLD2 signal is not true, then only 1 clock of hold time is required from the activation of the RAS* signal and control proceeds directly from state R1 to state R3. In state R2, the MRAS signal is asserted and the MCAS signal is negated. Control proceeds from state R2 to state R3 on the next rising edge of the processor clock signal.

In state R3, the MRAS signal is true or high, while the MCAS signal is set high if the next state is to be state C1 and otherwise the MCAS signal is set low. Control proceeds from state R3 to state C1, the first of the column states, if the column address ready (CADRRDY) signal is true as provided by the memory address state machine 708 to indicate that the particular column address set up time, be it read or write, has been satisfied and either a PCI read operation is occurring or a memory to processor bus read operation is occurring, and the memory operation is not stalled waiting for read data; or a write operation from the processor to memory or the PCI bus to memory is occurring with the data being valid as indicated by the MDVALID signal which is provided by the memory data state machine 714. Therefore, if the column address set up time has been met and indication of write operation data being properly valid for write cases is provided, control proceeds from state R3 to state C1. Otherwise, control remains in state R3 waiting for the timing conditions to be satisfied.

In state C1, both the MRAS and MCAS signals are high to indicate that the CAS portion of the cycle is occurring. Control proceeds from state C1 to state C2 if the CASPW3 or CAS pulse width 3 clock signal is true. If the CASPW3 signal is not true, control proceeds directly from state C1 to state C3, with control always proceeding from state C2 to state C3 on the next rising edge of the processor clock signal. In state C2, the MRAS and MCAS signals are both also true.

Thus, state C2 is skipped if the CAS pulse width can be narrower, as would be true for faster memory or slower processors with an additional clock period provided when necessary.

In state C3 the MCAS signal is negated to a 0 level to indicate completion of the particular memory cycle and the MRAS signal is set to 0 if the next state is the RI state or if the particular cycle is aborting. Otherwise, the MRAS signal remains in a high or asserted state to allow operation in page mode if appropriate. Control proceeds from state C3 to state RI if a burst operation is not occurring, which is a preferable operation for 486 and Pentium processors, or the current memory to PCI read cycle is being aborted as explained below; the next memory to PCI read operation is not aborted; there is no indication that the M2I cycle is to be aborted as indicated by the M2IABORT signal or the CLRI2M signal; and a non-refresh cycle is occurring (M2P+ ADDRRDY) and this is not a page hit; a refresh cycle is occurring or there is no cycle pending and the RAS_UP signal is true, indicating that the RASUP block 704 has indicated that the prediction is for the next cycle to be a page miss. The RAS_UP signal is generated as follows: RAS_UP=!(((!WRITEBACK && P2M)||(!MDATARD && M2P)||(!Q_I2MQEMPTY && I2M)||(!M2IABORTCUR && M2IMULREAD && !M2IABORTNEXT)||HIT2MOD) Therefore, the RAS* signal is kept low or in page mode following processor to memory write operations which were not writebacks from the L1 or L2 caches, processor code read operations, PCI bus write operations with pending write operations, Memory Read Multiple operations from the PCI bus 98 which are not being aborted, or hits to a modified address, indicating that a writeback operation has just occurred. In all other cases the RAS_UP signal is true, such that it is considered better to initiate a full new page access to allow precharging to occur during the idle period.

If the conditions for transfer from state C3 to RI are not true, control proceeds from state C3 to state RN or the RAS low idle state. In this state the MRAS signal is low if the next state is state RI otherwise the MRAS signal is asserted. The MCAS signal is asserted if the next state is C1, otherwise the MCAS signal remains in low state. Control proceeds from the RN to C1 state for burst operations in general if the column address set up time has been met and there are no abort operations occurring. Control proceeds from the RN state to the RI state under conditions which generally indicate that the cycle is being aborted or a processor non-burst read which is a page miss is next to occur. In all other cases, control remains at state RN, idling with the RAS* signal low until a cycle needs to be run or an abort or page miss occurs. Therefore, it can be seen that the memory state machine 700 drives the MRAS and MCAS signals based on the timing values of the proper bank, these timing values being variable as indicated above.

Figure 10:
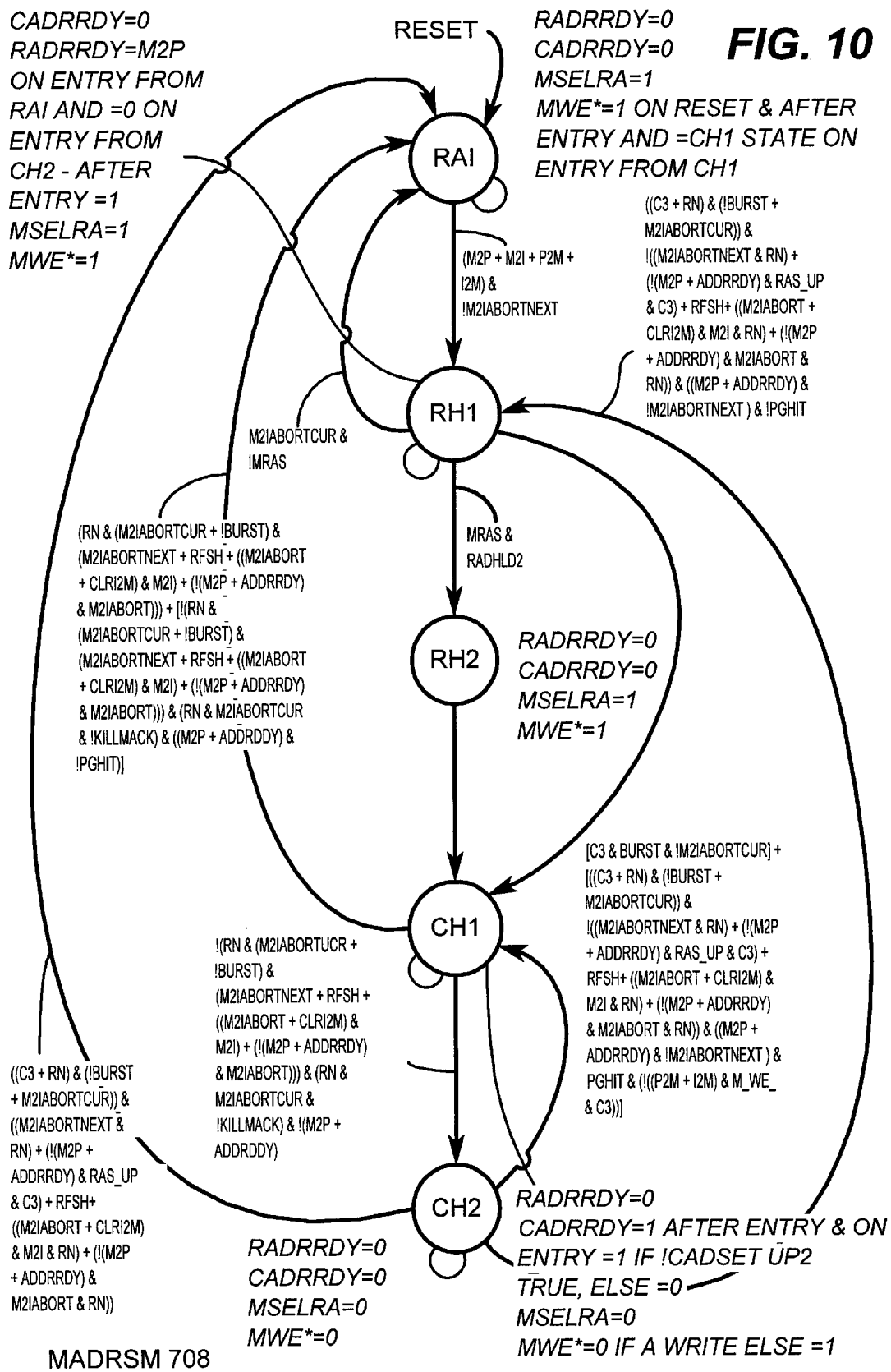

A memory address state machine 708 is shown in FIG. 10. The state machine 708 starts at state RAI upon reset. In this state, the RADRRDY signal and CADRRDY signals are set low to indicate that the row and column addresses are not ready, and the MSELRA signal is set high to initially select the row address to be provided to the memory devices. The MWE* signal is set to 1 or negated level on reset and after entry into the RA1 state and is set equal to the CH1 state value the first state after entry from the CH1 state as described below. Control proceeds from the RAI state to the RH1 state if an active cycle is pending from the PCI bus 98 or processor 200 and the next cycle in the read ahead operation is not to be aborted. The current M2I read cycle is aborted under certain conditions, such as receipt of M2IABORT signal or a writeback is occurring, while the next M2I read cycle is aborted when the M2INA signal has been received but the cycle not started when the M2IABORT signal is received. In all other cases control loops at state RAI.

In state RH1 the CADRRDY signal is set low and the RADRRDY signal is set to the value of M2P or memory to processor read upon entry from the RAI state, is equal to 0 on entry from the CH2 state as defined below and after entry into the RH1 state is set to a 1 level. The MSELRA and MWE* signals are set to high levels so that the row address is selected and a write operation is not indicated. Control proceeds from the RH1 to the RH2 state if the MRAS signal is true from the memory state machine 700 and the RADHLD2 signal or row address hold time signal is set to indicate slower memory devices. If the MRAS signal is true and the RADHLD2 signal is not set, control proceeds from the RH1 state directly to state CH1, which is also where control proceeds on the next clock signal in the RH2 state. In all other cases, operation loops at the RH1 state. In the RH2 state, the RADRRDY signals and CADRRDY signal are set low, and the MSELRA and MWE* signals are set at high state. Control proceeds from the RH2 to the CH1 state.

In the CH1 state, the RADRRDY signal is low to indicate that the row address set up time has not been met. The CADRRDY signal is set to a high or true value after initial entry into the state. On entry the CADRRDY signal is set high if short CAS address setup times were set (!CADSETUP2) for the read or write as appropriate, and otherwise is set low. The MSELRA signal is set to 0 to indicate that the column addresses are selected and the MWE* signal is low if a write operation is occurring.

Control proceeds from the CH1 state to the RAI state if the memory state machine 700 is in state RN and either the cycle is aborting or a processor read page miss is pending. Control proceeds from the state CH1 to state CH2 if the memory state machine is not in state RN or the cycle is not aborting completely or the processor read cycle is a page hit. In the CH2 state the RADRRDY and CADRRDY signals are set low to indicate that no addresses are ready. The MSELRA signal is set low and the MWE* is set low to indicate the write operation is occurring and the column addresses are provided. Control proceeds from the CH2 state to the CH1 state for ongoing burst cycles when the memory state machine is in state C3 or for pending processor read page hit operation. Control proceeds from the CH2 state to the RAI state if the cycle is aborting or if an idle condition is present and the RAS* signal is to be set high. Control proceeds from the CH2 to the RH1 state if a processor read page miss operation is to occur and the memory state machine 700 is at the end of a cycle.

Therefore the memory address state machine 700 properly provides the MWE* signal for the DRAM devices and controls the address multiplexor 710. In addition, the RADRRDY and CADRRDY or row and column address ready signals are provided to the memory state machine 700 based upon the column and row address set up times as provided in the memory timing registers.

Figure 11:
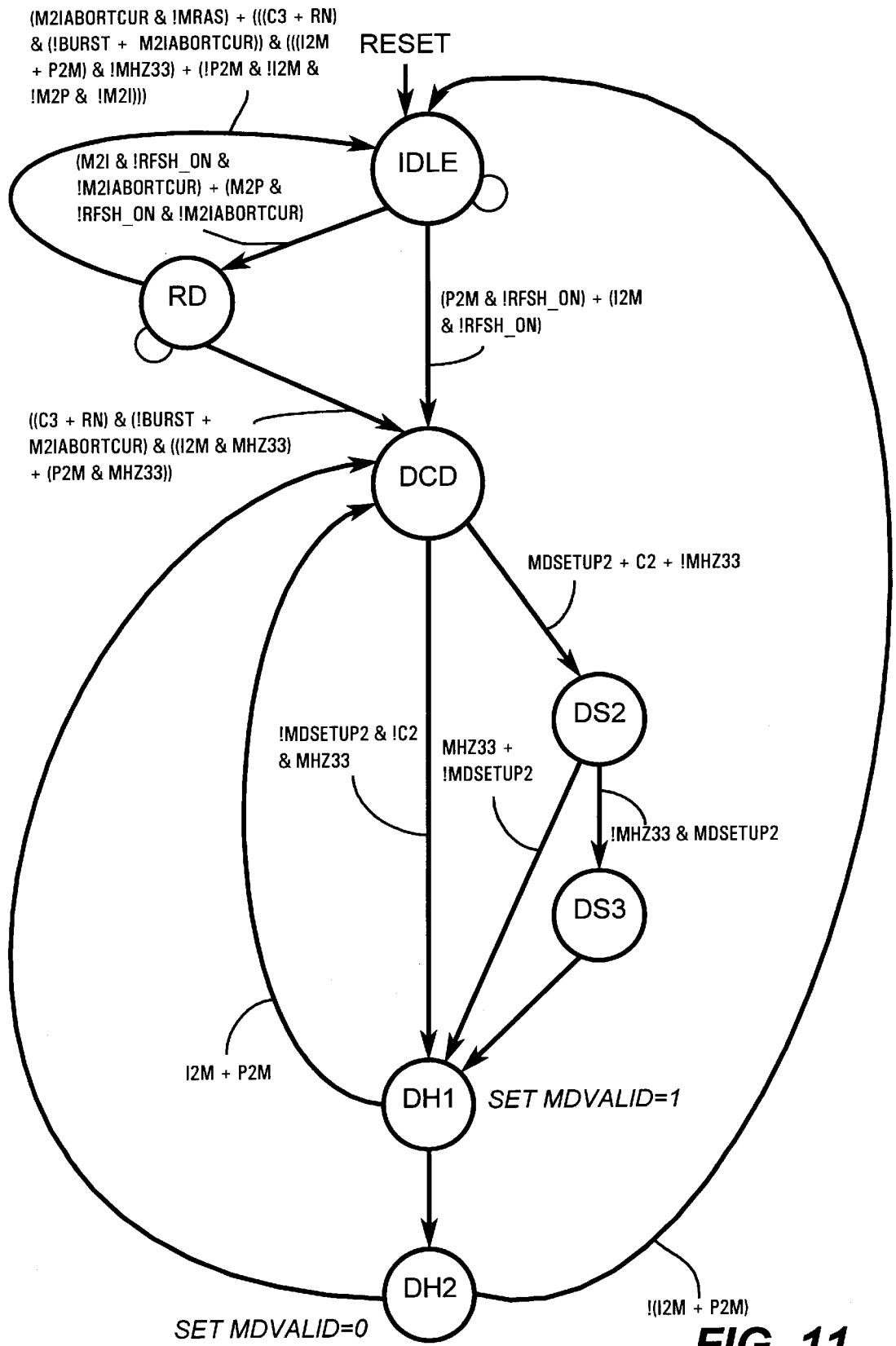

The MD or memory data state machine 714 is illustrated in FIG. 11. The state machine 714 starts at the IDLE state upon reset. Control proceeds from the IDLE state to a RD state for processor or PCI bus 98 read operations which are not being aborted and refresh is not occurring. Control proceeds to the DCD state if a processor to memory write operation is occurring and there is no refresh or if a PCI bus to memory write operation is occurring and again there is no refresh. Control otherwise remains at the IDLE state. Control proceeds from the RD state to the DCD state if the memory state machine is in states C3 or RN, the cycle is either being aborted or is not a burst cycle and it is a write operation with a 33 MHz processor. Control proceeds from the RD state to the IDLE state if MRAS is negated and the cycle is aborting or the memory state machine is in states C3 or RN, the cycle was not a burst or is aborting, and a non-33 MHz processor write operation or PCI bus 98 write cycle is pending or no cycles are active. In all other cases, control remains at state RD.

Control proceeds from the DCD state to the DH1 state if the MDSETUP2 signal is not true, indicating that this is a fast memory data set up case, and the memory state machine 700 is not in state C2 and 33 Mhz operation is indicated for the processor. In all other cases, control proceeds from the DCD state to the DS2 state. Control proceeds from the DS2 state to a DS3 state if the processor 200 is not operating at 33 Mhz and the MDSETUP2 signal is set to indicate slower memory data set up times. Control proceeds from the DS2 to DH1 states in all other cases. Control proceeds from the DS3 state to the DS1 state on the next rising edge of the clock signal.

In the DH1 state, the MDVAL1D signal is set to 1 or asserted to indicate that the memory data set up time to the column address strobe has been met. This allows the memory controller state machine 700 to proceed to state C1. Control proceeds from the DH1 state to the DCD state if further write operations are pending and otherwise proceeds to the DH2 state. In the DH2 state, the MDVAL1D signal is set to 0 to indicate that the memory is no longer valid. The value of the MDVAL1D signal is not changed in any states other than the DH1 and DH2 states, except it is cleared on reset. Control proceeds from the DH2 state to the IDLE state if no write operations are pending from the PCI bus 98 or from the processor 200. In all other cases, control proceeds from the DH2 state to the DCD state. In this manner, the memory data state machine 714 provides the MDVAL1D signal to the memory state machine 700 when the memory data is properly set up.

Figure 12:
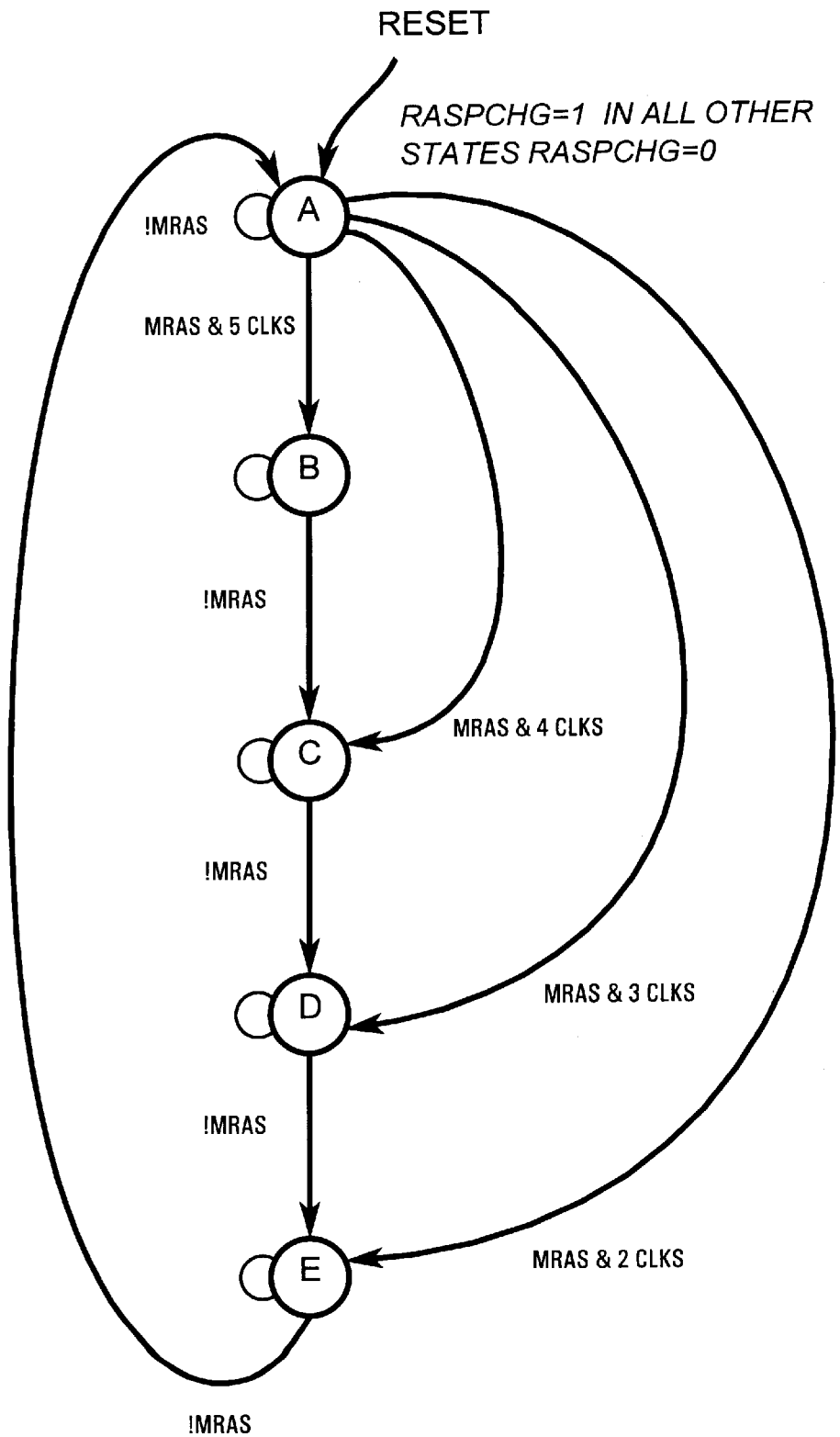

The precharge state machine 702 is shown in FIG. 12. Upon reset, the state machine 702 operation commences at state A. Control remains in state A when the MRAS signal is not asserted. When the MRAS signal is asserted, control proceeds to one of states B, C, D, or E, dependent upon the number of clocks defined for the precharge time. Control proceeds to state B for five clocks, to state C for four clocks, to state D for three clocks and to state E for two clocks. Control proceeds from states B to C to D to E, sequentially, when the MRAS signal is not asserted. Otherwise, control remains in each particular state. Control then proceeds from state E back to state A when the MRAS signal is deasserted. Therefore the precharge state machine 702 leaves state A upon the commencement of a particular memory operation and then does not begin traversing the remaining states until the MRAS signal has been negated, so that a precharge period has started. It is noted that this results in the proper precharge time for any given bank, even if banks are being switched in sequential memory operations if refresh operations are ignored. This occurs because, as noted above, when a particular bank is not selected the RAS* signal for that bank is set high so that it is in a precharge period. Thus if the bank is not selected, it has been through at least one full memory cycle of precharge, which is sufficient to provide the required recharge in all cases. Thus, the precharge time is set for that of the particular memory bank on which the current cycle is operating, so that if back to back cycles occur on that particular memory bank, the memory devices are properly precharged.

However, refresh operations somewhat degrade this operation as it is not known in the preferred embodiment which bank will be requested after a refresh cycle, so to simplify the design of the preferred embodiment, the precharge value for all of the DRAM types is set to the worst case by the initialization or POST software. This reduces performance in certain cases but simplifies the design. A slightly more complicated design would use the worst case value, preferably provided to a predetermined register for only the first precharge operation after a refresh cycle and thereafter operation would revert to the optimal timing for each bank.

Write addresses and data traverse through the I2M queues 248 and 264 based on having posted data and the arbiter 550 providing access to the queues 248 and 264 by the memory system. The write addresses are provided to the PCON block 230 when placed in the I2M queue 248, to allow the PCON block 230 to control snooping of the address by the L1 and L2 cache controllers. Read operations occur in a different fashion than write operations. Read addresses are provided to the MCON block 234 along with an indication that a read request has issued. The read addresses are provided based on a return of an L2 cache line, which is 4 32 bit words for 486 microprocessors and 8 32 bit words for Pentium processors. Therefore, when an M2I read is requested, four or eight 32 bit words are provided, with the ICON block 232 properly providing the data from the read operation to the PCI bus 98 as required. The read request indications are provided by a memory to PCI next address state machine described below. The read request is also provided to the arbiter 550 for arbitration and to the PCON block 230 to allow L1 and L2 cache snooping with a writeback in case of a hit to a modified line. When the arbiter 550 provides the approval to proceed with the PCI bus 98 read, the MCON block 234 then proceeds to process the information. It is noted that this will have occurred only after the I2M queues 248 and 264 are emptied of any pending write operations so that the I2M data queue 264 provided in the data buffer 212 and 213 can be utilized to do a block read operation of the lengths indicated.

Figure 13:
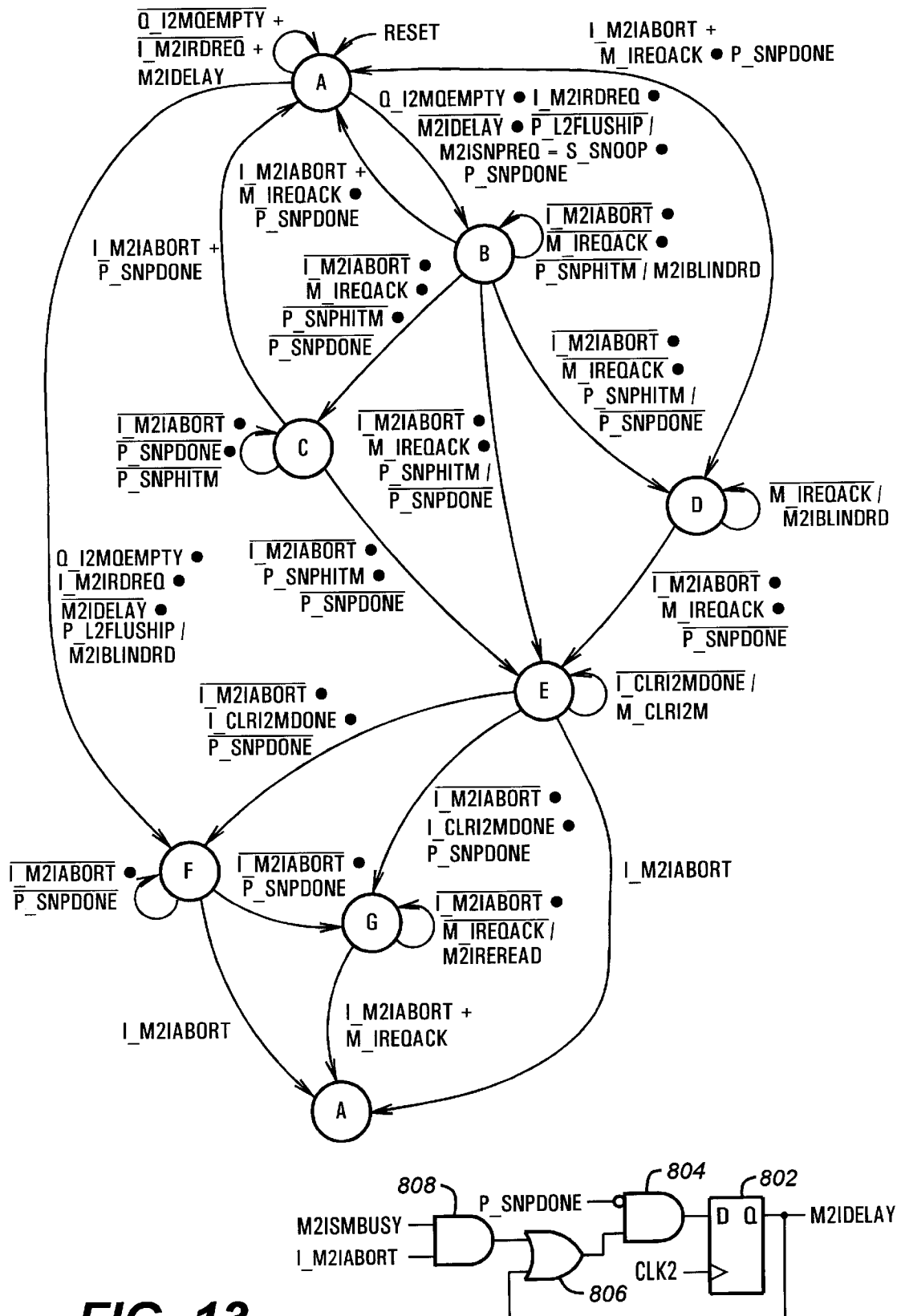

Therefore, when the I2M queues 248 and 264 are emptied, the read operation commences and is controlled by an M2I state machine as shown in FIG. 13. The state machine commences at state A upon reset. Control then proceeds to state B if the I2M queue 264 is empty, a read is requested and the L2 cache 208 is not being flushed. This would be a normal read condition. If instead, the L2 cache 208 is being flushed, control then proceeds from state A to state F, assuming that the I2M queue 264 is empty and the read request is present. Otherwise control remains at state A waiting for the read operation to be initialized.

From state B, control proceeds to one of four different states. Control returns to state A if the M2IABORT signal has been received, indicating that the PCI bus master has aborted the read operation, or if the IREQACK signal is true, which indicates that the next operation as determined by the arbiter 550 will be a PCI read, and the SNPDONE signal is true indicating that the PCON block 230 has completed snooping the read operation address to the level 2 cache and to the level 1 cache in the processor 200. Control proceeds from state B to state C if the M2IABORT signal is not asserted, the next cycle is a PCI read as indicated by the IREQACK signal being asserted, there has not been a snoop hit to a modified (SNPHITM) location as indicated by the PCON block 230 and the snoop operation has not been completed, as also indicated by the PCON block 230. This will be the case where a read operation has been requested and has been arbitrated but may have to be aborted because the snoop operation has not been performed and a hit to a modified location may yet occur. Control proceeds from state B to state D, if the operation is not being aborted and a PCI read has not been arbitrated, but there has been a snoop hit to a modified location with the writeback operation not yet completed. Control proceeds from state B to state E if the cycle is not aborted, has been arbitrated as indicated by the IREQACK signal and there has also been a snoop hit to a modified location, so that a writeback operation from the appropriate cache controller will be occurring. In all other cases control remains at state B.

Control proceeds from state C back to state A if the cycle is being aborted or if the snoop is completed without being a hit to a modified location. Control proceeds from state C to state E if the cycle is not aborted and there has been a snoop hit to a modified location. Otherwise, control remains at state C until the snoop operation is completed, the cycle is aborted or there is a snoop hit to modified. Control proceeds from state D back to state A if the operation is aborted or upon indication that the PCI cycle is next for operation and the snoop has completed. This would occur after the writeback has been completed and then the PCI operation is next to occur, as the write back will have superseded the PCI operation. Control proceeds from state D to state E if it is not being aborted, the PCI request is next and the snoop has not been fully completed. Otherwise control remains at state D.

In state E, the CLRI2M signal is set to indicate to other portions of the memory controller 210 that because of the writeback, the data in the I2M queue 264 must be flushed and discarded. A CLRI2MDONE signal indicates this flushing has been completed. Control proceeds from state E to state F if the cycle is not being aborted and the signal CLRI2MDONE or clear the queue done signal is true and the snoop is not yet completed. Control proceeds from state E to state G if the cycle is not being aborted, the clearing of the queue 264 has been completed and snoop has been performed. Control proceeds from state E to state A if the cycle is being aborted and in all other cases remains at state E.

Control proceeds from state F to state G if it is not being aborted and the snoop cycle has been completed. Other control proceeds from state F back to state A if the cycle is being aborted. Otherwise control remains at state F. Control proceeds from state G back to state A if the cycle is aborted or if it is next in line as indicated by the IREQACK signal.

Therefore, the M2I state machine controls transfer of information from the memory to the PCI interface using the I2M queue 264 located in the buffer 212 and 213. Data is not transferred until the queue 264 is cleared of any write data and then proceeds only based on snoop information and when the arbiter 550 allows it to proceed.

As noted above, the design of the preferred embodiment performs read ahead operations when a PCI Memory Read Multiple operation has been received. The operation proceeds as follows. The ICON block 232 receives a Memory Read Multiple cycle form the PCI bus 98 and when there is room in the I2M queue 264 issues an M2I read cycle request, along with an address, to the MCON block 234. The MCON block 234 arbitrates as described above and ultimately starts on the M2I read request. When it has started the operation, it provides a next address or M2INA signal to the ICON block 232 and provides the data to the I2M queue 264 along with the appropriate ready signals. The ICON block 232 knows a Memory Read Multiple command is occurring and issues another M2I read cycle request at the next address when the M2INA signal is received and the I2M queue 264 can receive another cache line of data. The ICON block 232 also receives the ready signals from the MCON block 234 and provides the data to the PCI bus 98. The MCON block 234 receives the M2I read cycle request and executes it when the cycle wins the arbitration. Conventionally this will be before the ICON block 232 has removed all of the data from the I2M queue 264 for the initial read request. The MCON block 234 then commences the read request and issues another M2INA signal. The MCON block 234 then provides the data to the I2M queue 264. The ICON block 232 receives this M2INA signal and again checks to see if there is space available in the I2M queue 264 to receive another cache line. When there is room because the ICON block 232 has provided sufficient data to the PCI bus 98, the next M2I read request is provided to the MCON block 234. This process continues until either the Memory Read Multiple completes, a page boundary is crossed or the PCI bus master aborts the cycle.

The abort case is the one of interest as the pending read ahead operation is terminated as soon as possible to save retrieving the entire cache line. This can be seen in the discussions of the MEMSM 700, the MADRSM 708, the MDCDSM 714 and the M2I state machine. This quick termination is seen in the MEMSM 700 as the return to the RI or C1 states from the C3 and RN states, so that the cycles finishes as soon as the current individual read operation is completed, thus potentially before the completion of the full cache line read. Similarly the MADRSM 708 returns to the RA1 state if a cycle has not started or when the column addresses have been provided. The MDCDSM 714 returns to the IDLE state if no operation has been started or if the MEMSM 700 is in the C3 or RN states. The M2I state machine returns to the A state whenever the M2IABORT signal is received. On detection of the abort, the ICON block 232 determines the end of the read cycle and resets its pointers to the data in the I2M queue 264 to indicate that no data is present, thus effectively discarding the data which has been read ahead. Thus the read ahead operation terminates as soon as possible after the abort indication is received, saving time by not completing the full cache line retrieval.

Figure 14:
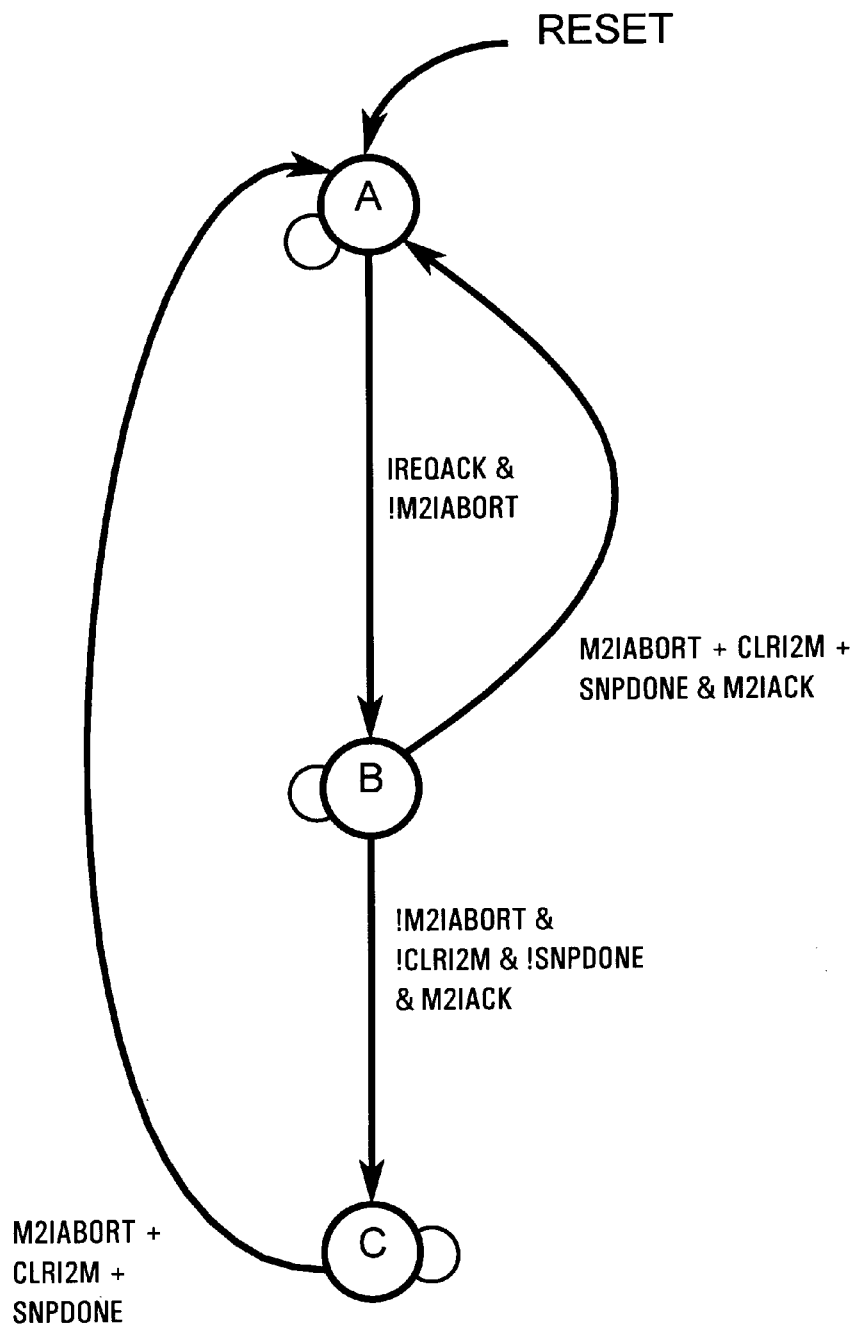

The next address indication to allow the read ahead is provided by the M2INA or memory to the PCI next address state machine shown in FIG. 14. The initial read address will have been provided using the conventional read request mechanism. An M2INA signal is provided to the MCON block 234 to indicate that the next read cycle can begin. This state machine begins operation in state A upon reset and proceeds to state B if the PCI read operation is next as indicated by the IREQACK signal and is not being aborted. Otherwise, control remains at state A. Control proceeds from state B back to state A if the cycle is being aborted or if the I2M queue 264 is to be cleared because of a writeback or if the snoop has been completed and the M2IACK signal is provided indicating that the prior read operation has been acknowledged by the MCON block 234. Otherwise control remains at state B. Control proceeds from state B to state C if the cycle is not being aborted, it is not necessary to clear the queue, the snoop operation has not completed and yet an M2IACK signal has been received. Control proceeds from state C back to state A if the cycle is aborted, the I2M queue 264 is being cleared, or the snoop is completed and otherwise remains in state C. Thus the M2INA state machine returns to idle upon receipt of an abort indication.

The M2INA signal is provided to the MCON block 234 to indicate that the next address is being provided, that is, another read request can be issued to keep the I2M queue 264 filled ahead of the PCI bus 98. The M2INA signal is provided if the cycle is not being aborted, the I2M queue 264 is not being cleared, the snoop of the previous read cycle has completed and the M2INA state machine is either in state C or in state B and the M2IACK signal has been received. This M2INA signal is an indication that the processing of the prior address is complete by the MCON block 234 and the processing of the next read address can begin. The actual incrementing of the read address value is performed in the ICON block 232 using an 8 bit counter, thus limiting the total read ahead length to 256 address values. When the counter reaches 255, the read ahead operation is terminated by logic not illustrated for simplicity by causing the Memory Read Multiple to be disconnected. A new address must be received from the PCI bus master to continue the Memory Read Multiple Operation. Referring now to FIG. 13, the M2I state machine M2IST and associated logic for controlling M2I read requests are shown. On system reset, the state machine M2IST transitions to state A, where it remains if the signal Q_I2MQEMPTY is deasserted low, or the signal I_M2IRDREQ is deasserted low, or the signal M2IDELAY is asserted high. The signal M2IDELAY is provided by a D flip flop 802, which is clocked by the signal CLK2. The D input of the D flip flop 802 is connected to the output of an AND gate 804, whose first input receives the inverted state of the signal P_SNPDONE, and whose second input is connected to the output of an OR gate 806. The first input of the OR gate 806 receives the signal M2IDELAY, and the second input is connected to the output of an AND gate 808. The inputs of the AND gate 808 receive signals M2ISMBUSY and I_M2IABORT. The signal M2ISMBUSY is asserted high if the state machine M2IST is not in idle state A. The signal I_M2IABORT is asserted high to abort an M2I read request. Thus, if the state machine M2IST is busy, or an M2I abort command has been received, and a snoop cycle is in progress on the processor bus 202 as indicated by the signal P_SNPDONE deasserted low, the D flip flop 802 drives the signal M2IDELAY high on the rising edge of the signal CLK2. Once asserted high, the signal M2IDELAY remains asserted until the signal P_SNPDONE is asserted high to indicate the completion of the snoop cycle. Thus, the signal M2IDELAY holds off subsequent M2I read requests if the signal I_M2IABORT is sampled active while the state machine M2IST is busy and a snoop cycle requested by the aborted M2I read request is still in progress.

If the expression (Q_I2MQEMPTY•I_M2IRDREQ•!M2IDELAY•!P_L2FLUSHIP) is true, then the state machine M2IST transitions from state A to state B. The signal P_L2FLUSHIP is asserted high by the PCON 230 to indicate that the L2 cache memory 208 is currently being flushed. Thus, if the I2M queue is empty, an M2I read request is asserted, and the signals M2IDELAY and P_L2FLUSHIP are deasserted low, then control transitions from state A to state B. The signal M2ISNPREQ is asserted high in the transition if the signals P_SNPDONE and S_SNOOP are asserted high. The signal S_SNOOP indicates that the PCI address associated with the asserted M2I read cycle is a cacheable address, that the L1 or L2 cache is enabled, and that the L1 or L2 cache is configured in writeback mode. Assertion of the signal M2ISNPREQ causes a snoop cycle to be generated by the PCON 230 on the processor bus 202. In state B, if the abort signal I_M2IABORT is asserted high, the state machine M2IST returns from state B to state A. Control also returns to state A if the signals M_IREQACK and P_SNPDONE are asserted high to indicate that the M2I read request has been granted by the arbiter and the snoop cycle requested by the M2I read request has been completed.

In the following discussion, the abort signal I_M2IABORT is assumed to be deasserted low unless indicated otherwise. From state B, the state machine M2IST transitions to state C if the signal M_IREQACK is asserted high and the signals P_SNPHITM and P_SNPDONE are deasserted low. This indicates that the M2I read request has been granted, but the requested snoop cycle has not yet completed. While the signals P_SNPDONE and P_SNPHITM remain low, the state machine M2IST remains in state C. However, if the signal P_SNPDONE is asserted high to indicate the completion of the snoop cycle without a hit to a modified line in either the L1 or L2 cache, the state machine M2IST returns to state A. In addition, control returns to state A if the abort signal I_M2IABORT is asserted high. In state C, if the signal P_SNPHITM is asserted high and the signal P_SNPDONE is deasserted low, the state machine transitions from state C to state E. This indicates that a hit has occurred to a modified line in either the L1 or L2 cache and a writeback cycle will be performed.

The state machine M2IST transitions directly from state B to state E if the signals M_IREQACK and P_SNPHITM are asserted high and the signal P_SNPDONE is deasserted low. This indicates that the M2I read request has been granted, but the M2I read address has hit a modified line in either the L1 or L2 cache.

In state B, if the signals N_IREQACK and P_SNPDONE are deasserted low, and the signal P_SNPHITM is asserted high, then control proceeds from state B to state D. This indicates that the M2I read request has not been granted by the arbiter and the snoop address has hit a modified line in either the L1 or L2 cache. In state D, if the signals M_IREQACK and P_SNPDONE are asserted high, the state machine M2IST returns to state A. The state machine also returns to state A if the signal I_M2IABORT is asserted high. The state machine M2IST transitions from state D to state E if the signal M_IREQACK is asserted high but the signal P_SNPDONE is deasserted low, indicating that the M2I read request has been granted, but the L2 writeback cycle has not yet completed.

The state machine M2IST remains in state E while a signal I_CLRI2MDONE is deasserted low. In state E, a signal M_CLRI2M is asserted high to clear the I2M queue in the data buffers 212 and 213. Since the M2I read and snoop request are executed concurrently, the M2I read data may already be in the bi-directional I2M queue of the data buffers 212 and 213. Consequently, the I2M queue must be reset to ensure that the data obtained from a subsequent M2IREREAD request (described below) is the data transmitted to the PCI bus 98. When the clearing of the I2M queue is completed, the signal I_CLRI2MDONE is asserted high by the ICON 232.

If the abort signal I_M2IABORT is asserted high, the state machine transitions from state E back to state A. But if the signal I_M2IABORT is deasserted low, and the signals I_CLRI2MDONE and P_SNPDONE are asserted high, the state machine M2IST transitions from state E to state G. The transition indicates that the I2M queue has been cleared and the writeback of the modified cache line has completed. However, if the signal I_CLRI2MDONE is asserted high, but the signal P_SNPDONE is deasserted low to indicate that the writeback cycle has not completed, the state machine M2IST transitions from state E to state F. In state F, if the abort signal I_M2IABORT is asserted, the state machine returns to state A. But if the signal I_M2IABORT is deasserted low, and a signal P_SNPDONE is asserted high, the state machine M2IST transitions from state F to state G. In state G, the state machine M2IST asserts the signal M2IREREAD high to regenerate the M2I read request that hit a modified line in either the L1 or L2 cache. The state machine remains in state G until the arbiter responds to the assertion of the signal M2IREREAD by driving the signal M_IREQACK high. When that occurs, the state machine transitions from state G back to state A. In addition, the state machine also returns to state A if the abort signal I_M2IABORT is asserted high.

In state A, if the L2 cache memory 208 is flushed, as indicated by asserting the signal P_L2FLUSHIP high, and if the signals Q_I2MQEMPTY, I_M2IRDREQ, and M2IDELAY are driven high, high and low, respectively, the state machine M2IST transitions to state F. When the L2 cache memory 208 is flushed, all its modified lines are written back to the main memory 214. Thus, if a L2 cache flush cycle is in progress, the pending M2I read request is treated as if its address has hit a modified line in the L2 cache memory 208. After the flush operation has completed, and all of the modified lines have been written back from the L2 cache memory 208 to the main memory 214, the signal P_SNPDONE is asserted high to cause the state machine M2IST to transition from state F to state G. In state G, the signal M2IREREAD is asserted high as an M2I read request.

The signal M2IBL1NDRD is asserted high when the state machine M2IST is in state B or in state D. Also, the signal M2IBL1NDRD is asserted high if the state machine M2IST is in state A and the signal P_L2FLUSHIP is asserted high. Thus, when asserted high, the signal M2IBL1NDRD indicates that the status of the requested snoop cycle is unknown. Thus, an arbitration system has been described for controlling access to the main memory for requests asserted by the microprocessor, the refresh controller and PCI bus masters. Generally, the priority of the memory requests are as follows, with some exceptions: (1) second refresh request; (2) processor-to-memory write request; (3) memory-to-processor read request; (4) PCI-to-memory write request; (5) memory-to-PCI read request; and (6) first refresh request. The second refresh request indicates that two refreshes are outstanding. When that occurs, both outstanding refresh requests are assigned the highest priority.

The processor-to-memory write request is always higher in priority than other memory requests except the second refresh. However, under certain conditions, the processor-to-memory write requests is held off to allow other cycles to proceed. The memory-to-processor read request is generally higher in priority than the PCI write and read requests, unless certain conditions occur to override that priority. PCI-to-memory write requests are always higher in priority than memory-to-PCI read requests.

Figure 15:
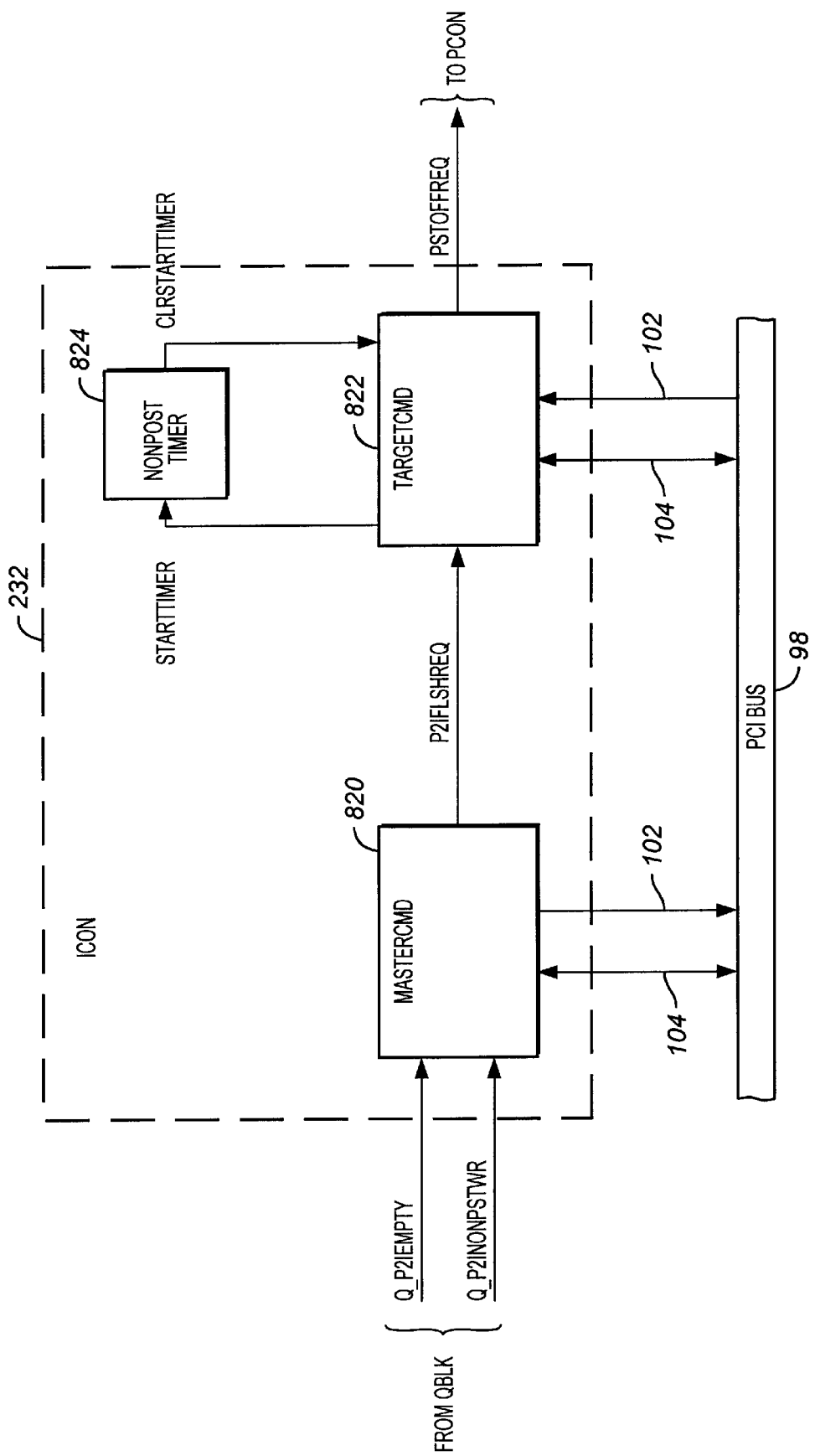
FIG. 15 is a more detailed block diagram of the ICON block of FIGS. 2A and 2B.

Now referring to FIG. 15, there is illustrated a more detailed block diagram of the ICON block 232. The ICON block 232 is coupled to the PCI bus 98 and is responsible for handling communications with the PCI bus 98. A MASTERCMD block 820 is responsible for communications over the PCI bus 98 when CMC 210 is acting as a PCI master. A TARGETCMD block 822 is responsible for handling communications over the PCI bus 98 when CMC 210 is the target of another PCI bus master, such as the SCSI/NIC controller 120. Of particular interest to the present invention is a posting off request (PSTOFFREQ) signal provided from the TARGETCMD 822 for indicating that posting to the P2IQ 242 should be held off.

The posting preclusion functions as follows. If a PCI master attempts to read from memory 214 and the P2IQ 242 is not empty, the PCI master is retried while the P2IQ is flushed. This is performed to ensure that writes to PCI and memory by the processor 200 are not performed out of order. Thus, the PCI master is prevented from accessing memory until the P2IQ is empty. However, as described above, CMC gives the processor queues higher priority than PCI queues, therefore if the processor continues to stream data to the P2IQ then the PCI master is prevented or starved from accessing memory until the processor is done. In some cases, the delay before the PCI master can access memory can be fatal. For example, if the network connection of the SCSI/NIC 120 does not receive data within a certain time period, the network will assume the node has disconnected, thereby dropping the logical connection from the network, i.e. terminating the data transfer.

According to the preferred embodiment of the invention, anytime a PCI master attempts to read from memory 214, the PSTOFFREQ signal is provided to the PCON 230 to prevent the P2IQ 242 from receiving any more write posts from the processor 200. If the P2IQ is not empty, the PCI master is retried and the MASTERCMD 820 provides a P2IQ flush request (P2IFLSHREQ) signal to the TARGETCMD 822 which causes a start timer (STARTTIMER) signal to be generated by the TARGETCMD 822 when the memory read command is received. The STARTTIMER signal is received into a NONPOSTTIMER block 824 which contains a timer for extending the PSTOFFREQ signal long enough to, on average, allow the requesting PCI master access to memory 214. Preferably, the processor 200 is not prevented from writing to the P2IQ 242 but instead is held off from completing the write operation until the PSTOFFREQ signal is deasserted. When the timer expires, a clear start timer (CLRSTARTTIMER) signal is generated by the NONPOSTTIMER block 824 which clears the PSTOFFREQ and STARTTIMER signals.

When the PCI master retries the read operation, if the PSTOFFREQ signal is still asserted and the P2IQ 2442 is empty or if the P2IQ has not yet accepted write posted data from the processor 200, the read operation will proceed as normal. The timer count is programmable so that bus master access and retry latencies can be taken into consideration.

Figure 16:
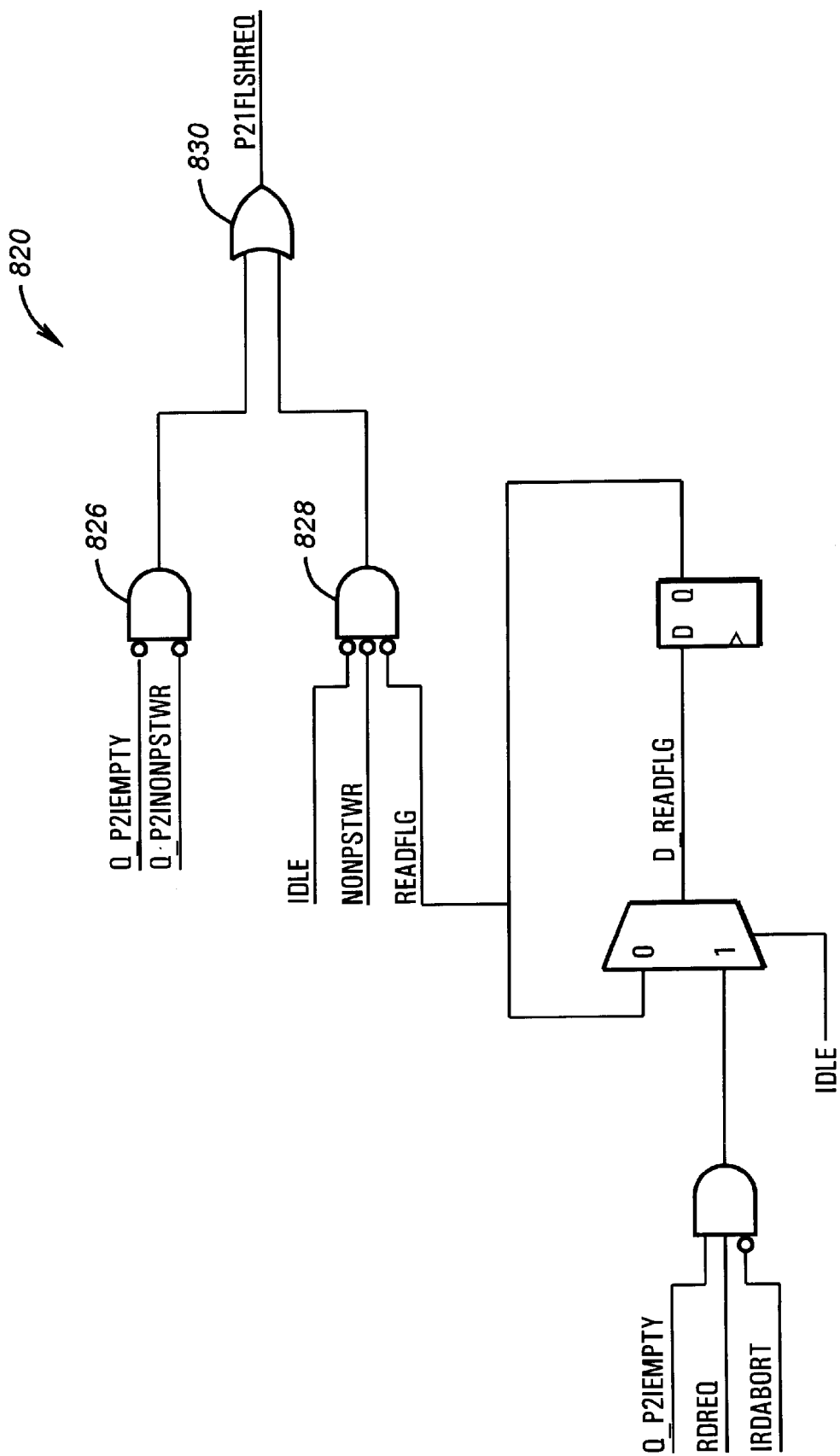
FIG. 16 is a logic diagram of the MASTERCMD block of FIG. 15 illustrating circuitry for generating a P2I flush request signal.

Now referring to FIG. 16 there is illustrated a logic diagram of a portion of the MASTERCMD block 820. The P2IFLSHREQ signal is provided by an OR gate 830. One input of the OR gate 830 is connected to a output of an AND gate 826 and another input is connected to an output of an AND gate 828. One inverted input of AND gate 826 is connected to a P2I queue empty (Q_P2IEMPTY) signal and another inverted input is connected to a P2I non-postable write (Q_P2INONPSTWR) signal. Thus, when the P2I queue is not empty and Q_P2INONPSTWR is deasserted, the P2IFLSHREQ signal is asserted.

The second input of the OR gate 830 is connected to an AND gate 828. The AND gate 828 has three inverted inputs for receiving an IDLE signal, a NONPSTWR signal and a READFLG signal. The IDLE signal indicates that the MASTERCMD state machine is idle and that CMC 210 is not currently a PCI bus master. The NONPSTWR signal indicates that write cycles to the PCI bus are not postable. The READFLG signal is provided when the MASTERCMD state machine is idle, the P2I queue is empty, a PCI read request is received and not aborted, as shown in FIG. 16.

Figure 17A:
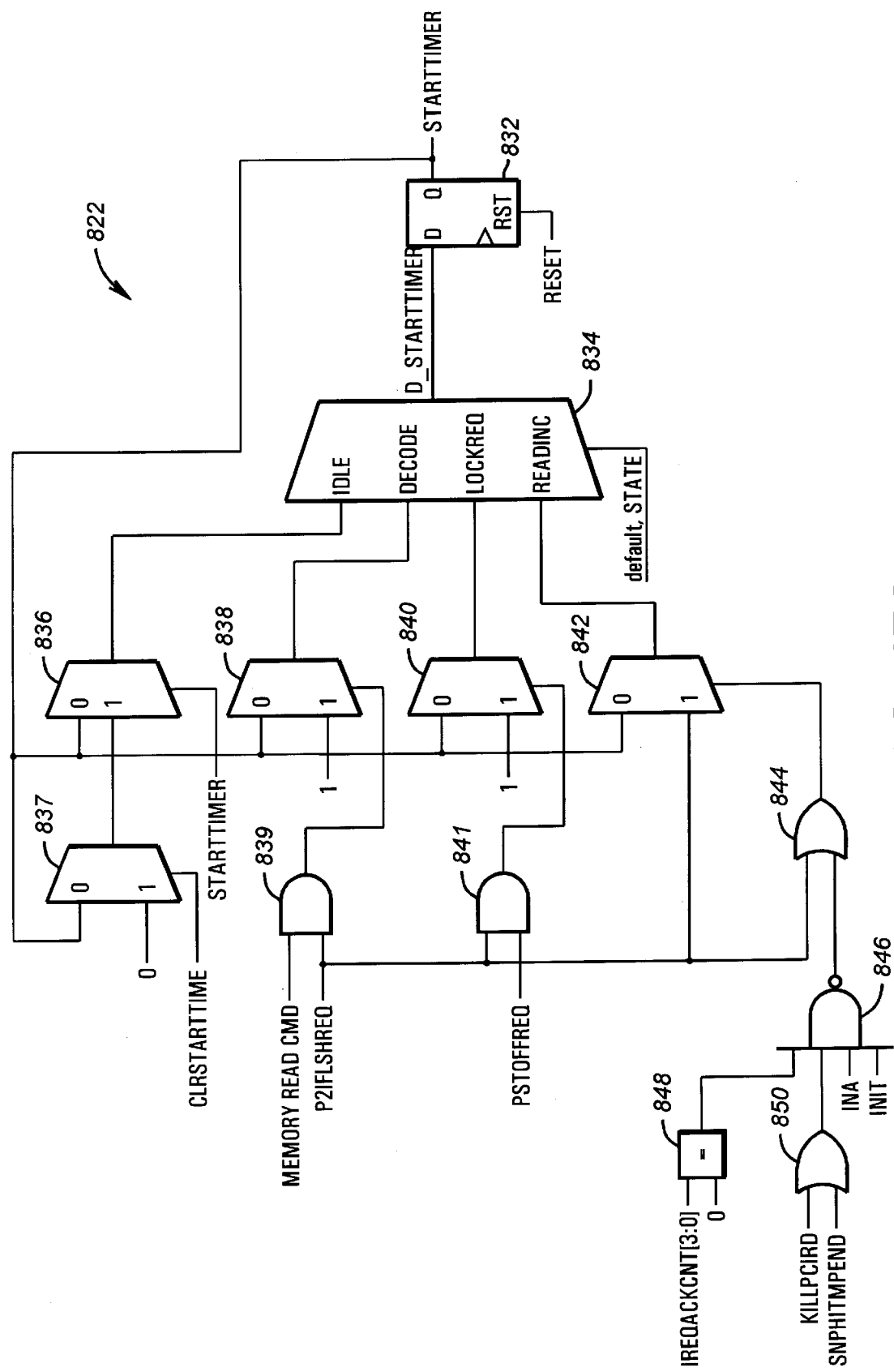
FIGS. 17A, 17B, 17C and 17D are logic diagrams of the TARGETCMD block of FIG. 15 illustrating circuitry for generating a non-post signal.

Now referring to FIG. 17A there is illustrated a logic diagram of the TARGETCMD block 822. The STARTTIMER signal is provided from a D flip-flop 832 for indicating that the NONPOSTTIMER 824 can be started. A multiplexor 834 provides an input to the D flip-flop 832 based upon the one of four inputs which are selected based on certain states of a state machine of the TARGETCMD block 822. If the state machine is IDLE, the output of a multiplexor 836 is passed by the multiplexor 834. The multiplexor 836 receives the STARTTIMER signal into a zero input and an output of a multiplexor 837 into a one input. The multiplexor 836 output is selected by the STARTTIMER signal. The multiplexor 837 receives the STARTTIMER signal into a zero input and a zero value into a one input. The multiplexor 837 output is selected by the CLRSTARTTIMER signal. Thus, when STARTTIMER is asserted and CLRSTARTTIMER is not yet asserted, STARTTIMER assertion is maintained in the IDLE state. When CLRSTARTTIMER is asserted in the IDLE state, STARTTIMER is cleared. The generation of CLRSTARTTIMER is discussed further below.

If the state is DECODE, a multiplexor 838 and AND gate 839 cause STARTTIMER to be forced to one, or asserted, if a memory read command is received and the P2IFLSHREQ signal is asserted, otherwise the current state of STARTTIMER is maintained. Thus, although the PSTOFFREQ signal is asserted anytime a PCI memory read cycle is received, the non posting timer is only enabled if the P2IQ is not empty.

If the state is LOCKREQ, a multiplexor 840 and AND gate 841 cause STARTTIMER to be asserted if P2IFLSHREQ and PSTOFFREQ are asserted, otherwise the current state of STARTTIMER is maintained.

If the state is READINC, the output of an multiplexor 842 is passed through the multiplexor 834. A zero input of the multiplexor 842 receives the STARTTIMER signal and a one input receives the P2IFLSHREQ signal. Selection is based upon the output of an OR gate 844 which receives the P2IFLSHREQ signal at one input and an output of a NAND gate 846 at another. One input of NAND gate 846 receives a signal from an equal comparator when a PCI request acknowledge (IREQACKCNT[3:0]) bus is equal to 0h, an inverted input of NAND gate 846 receives a next address indication (INA) signal, and a third input of the NAND gate 846 receives a initialize (INIT) signal, and a fourth input receives the output of an OR gate 850. The OR gate 850 receives a kill PCI read (KILLPCIRD) signal and a snoop hit memory pending (SNPHITMPEND) signal. So the READINC state always forces STARTTIMER active if P2IFLSHREQ is asserted.

Figure 17B:
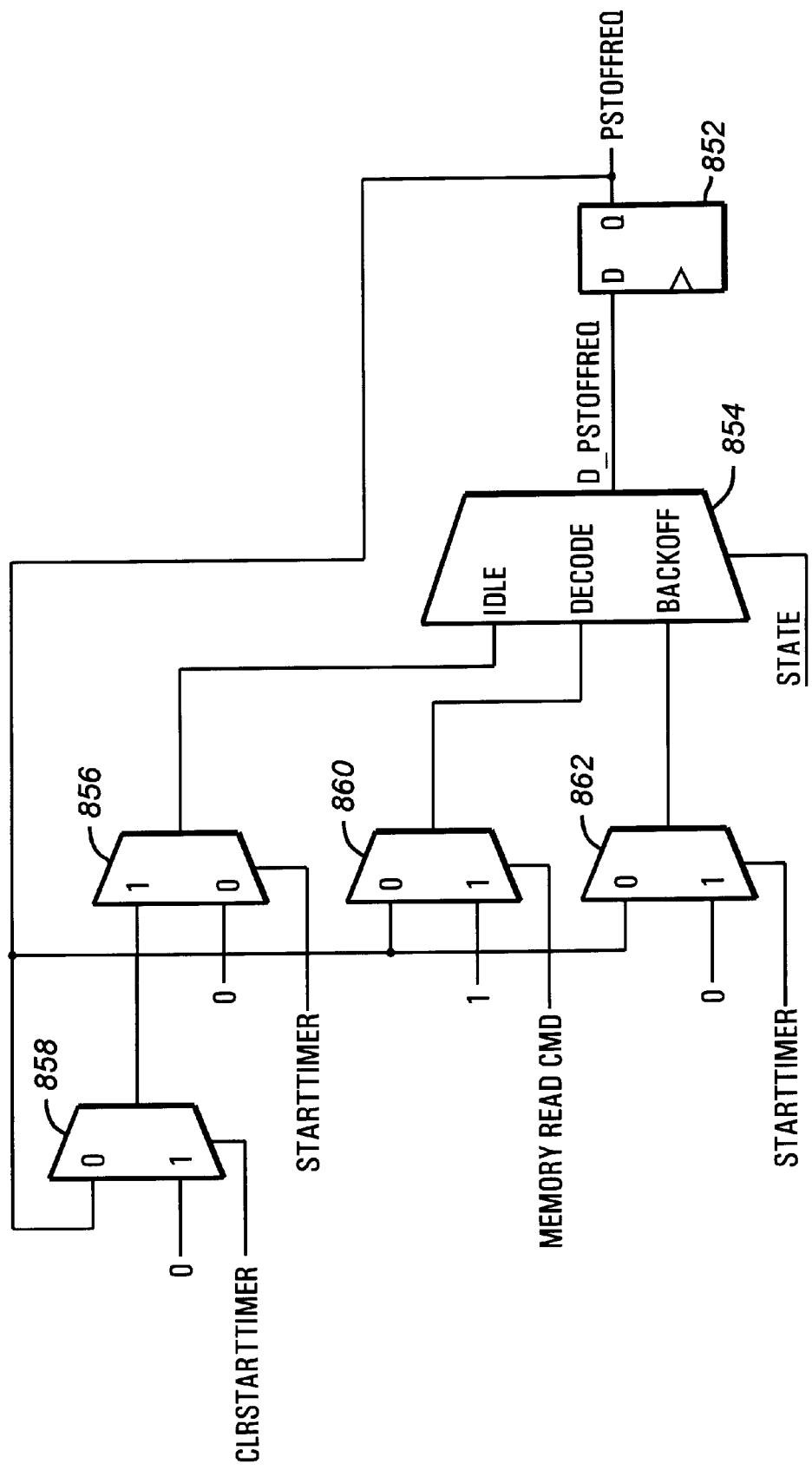

Now referring to FIG. 17B there is illustrated logic for generating the PSTOFFREQ signal. The PSTOFFREQ signal is provided by a D flip-flop 852. A multiplexor 854 provides an input to the D flip-flop 852 based upon the state machine of the TARGETCMD block 822. If the state is IDLE, the output of a multiplexor 856 is passed through the multiplexor 854. The multiplexor 856 passes values based on the STARTTIMER signal. The output of a multiplexor 858 is passed when the STARTTIMER signal is asserted and a zero value is passed when the STARTTIMER signal is not asserted. The multiplexor 858 passes the PSTOFFREQ signal when the CLRSTARTTIMER signal is asserted and passes a zero value when the CLRSTARTTIMER signal is not asserted. Thus, either deasserting STARTTIMER or asserting CLRSTARTTIMER will cause PSTOFFREQ to be cleared in the IDLE state, otherwise the current value of PSTOFFREQ is maintained.

If the state is DECODE, the output of a multiplexor 860 is received. The multiplexor 860 forces the PSTOFFREQ signal to be asserted whenever a PCI memory read command is received by CMC 210 and TARGETCMD 822. If a read command is not received in the DECODE state, the current value of PSTOFFREQ is maintained.

If the state is BACKOFF, the output of a multiplexor 862 is provided. The multiplexor 862 passes values based on the STARTTIMER signal. The multiplexor 862 passes the PSTOFFREQ signal when the STARTTIMER signal is asserted and passes a zero value when the STARTTIMER signal is not asserted. Thus, the PSTOFFREQ signal is maintained as long as P2IFLSHREQ is active, as described in FIG. 17A. It is noted that anytime STARTTIMER is deasserted and a PCI master is backed-off by TARGETCMD the PSTOFFREQ signal is deasserted. Thus, if the P2IQ is empty but the I2MQ is not yet flushed and a requesting PCI master is again backed off, the PSTOFFREQ signal is not maintained.

Figure 17C:
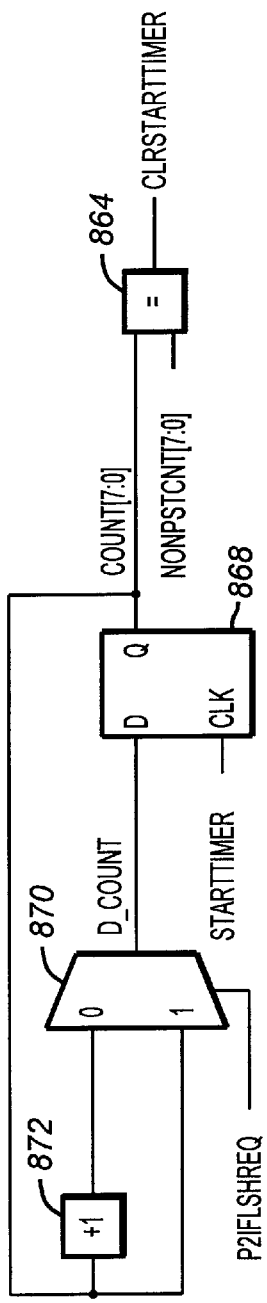

Now referring to FIG. 17C, there is illustrated logic of the NONPOSTTIMER block 824. The CLRSTARTTIMER signal is provided by an equal comparator 864 when a COUNT [7:0] is equal to a predetermined count, i.e. NONPSTCNT [7:0]. The predetermined count value is written into a configuration register of CMC 210 when the device is initialized. The count value is sufficiently large enough so after the P2IQ has been flushed, the PSTOFFREQ signal is maintained asserted, thereby allowing the PCI requesting device sufficient time to again request access to memory 214. Thus, the retry latency of the PCI requesting master is less than the count value, NONPSTCNT[7:0].

The COUNT[7:0] bus is provided by the Q outputs of a D flip-flop 868. An output of a multiplexor 870 provides the input to the D flip-flop 868. The multiplexor 870 passes COUNT[7:0]+1 when the P2IFLSHREQ signal is not asserted and passes COUNT[7:0] when asserted. If the STARTTIMER signal is not asserted, the D flip-flop 868 is cleared. If STARTTIMER is asserted, the D flip-flop 868 is not cleared and the timer is ready to begin counting. Counting commences when the P2IFLSHREQ signal is deasserted.

Figure 17D:
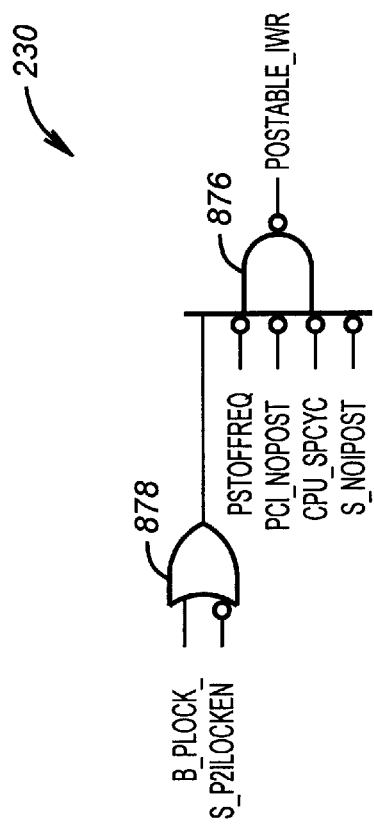

Now referring to FIG. 17D, there is illustrated logic of the PCON block 230 for controlling write posting to the P2IQ 242. A five input AND gate 876 receives signals for generating a postable write signal (POSTABLE_IWR) when processor 200 writes may be posted to the P2IQ 242. The AND gate 876 receives a signal from an OR gate 878 when either the processor lock signal (B_PLOCK_) or a SMAP lock signal (S_P2ILOCKEN) is deasserted. Along with the signal from the OR gate 878, the AND gate 876 indicates a postable write may be performed when PSTOFFREQ, PCI_NOPOST, CPU_SPCYC, and S_NOIPOST signals are deasserted. The PCI_NOPOST is asserted for certain non-postable address ranges on the PCI bus. The CPU_SPCYC signal indicates the processor 200 is running a special cycle. The S_NOIPOST signal is from a configuration register in CMC 210 which when asserted indicates that CPU to PCI write posting may be performed. Thus, when the POSTABLE_IWR signal is not asserted, write posting to the P2IQ is disabled and according to the arbiter 550 priorities described above, the P2IQ 242 will then clear allowing the PCI bus master to access memory 214.

Figure 18:
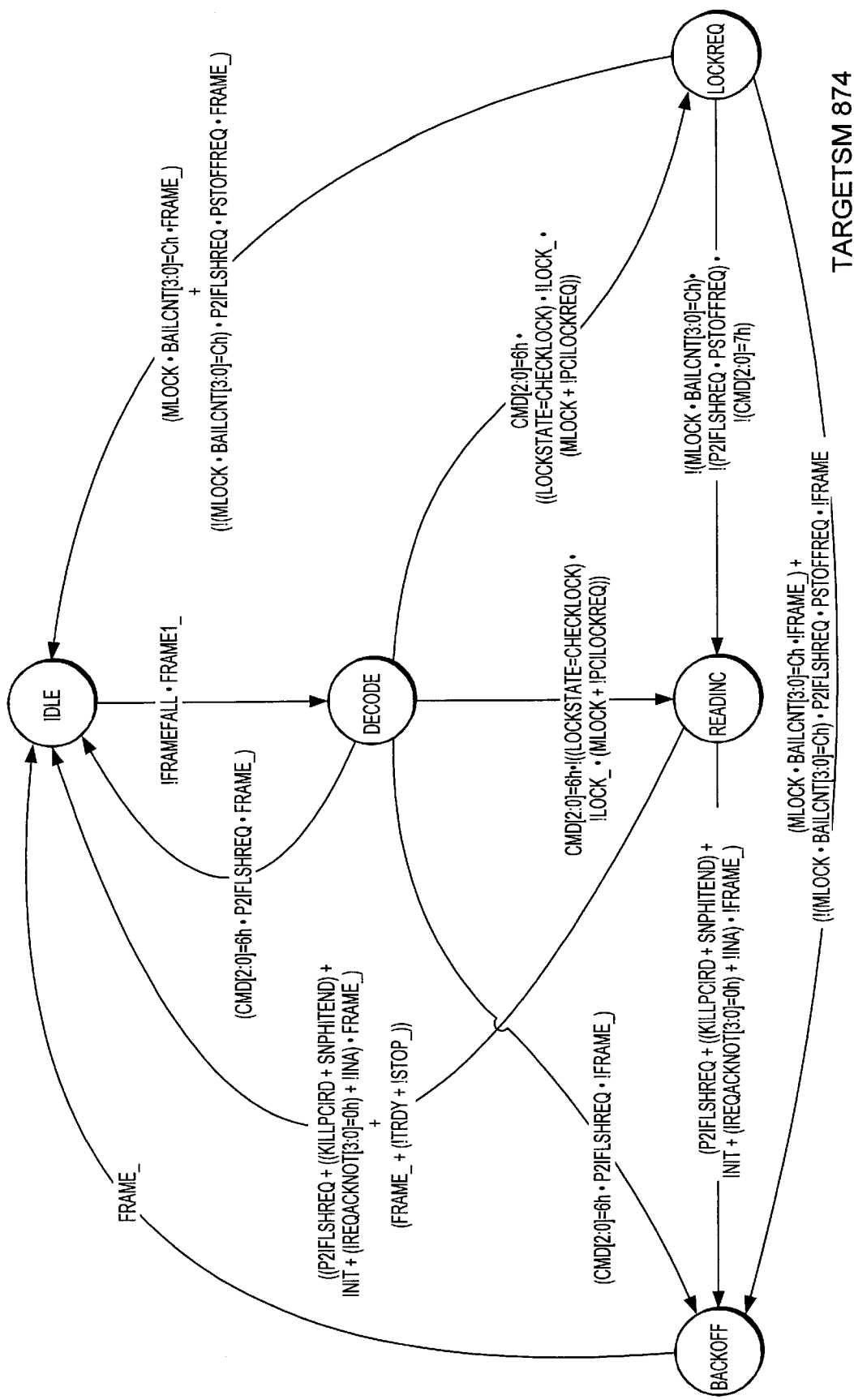
FIG. 18 is a state diagram illustrating the state machine of the TARGETCMD block of FIG. 15 for controlling incoming PCI transactions.

Now referring to FIG. 18, there is illustrated a state diagram of the state machine TARGETSM 874 of the TARGETCMD block 822. As described above, the TARGETCMD block 822 is responsible for communicating with the PCI bus 98 when CMC 210 is the target of a PCI transaction. If CMC 210 is not a target of a PCI transaction, or if CMC is a PCI bus master, the TARGETSM 874 is IDLE, as shown. If a PCI cycle is starting, as indicated by FRAMEFALL low and FRAME1_high, the TARGETSM 874 transitions to state DECODE.

The DECODE state decodes the incoming PCI command and other signals to determine how CMC 210 will respond to the transaction. Many conventional PCI cycles are handled by the TARGETCMD state machine but are not shown here for simplicity because they are not concerned with disabling the P2IQ 242. If a read command is received (CMD[2:0]=6h), the P2IFLSHREQ signal is asserted and the FRAME_signal is deasserted, as indicated by the equation below, the state machine transitions back to the IDLE state.

CMD[2:0]=6h•P2IFLSHREQ•FRAME_

If a read command is received, the P2IFLSHREQ signal is asserted and the FRAME_signal is asserted, as indicated by the equation below, the state machine transitions to state BACKOFF.

CMD[2:0]=6h•P2IFLSHREQ•!FRAME_

If a read command is received, a locked cycle is requested on the PCI bus (!LOCK_), and either the processor has memory locked (MLOCK) or the internal PCI lock request signal (PCILOCKREQ) has not yet been asserted, as shown by the equation below, the state machine transitions to state LOCKREQ.

CMD[2:0]=6h•((LOCKSTATE=CHECKLOCK)•!LOCK_• (MLOCK+!PCILOCKREQ))

If a read command is received, and a locked cycle is not in progress on the PCI bus, as indicated by the equation below, the state machine transitions to state READINC.

CMD[2:0]=6h•!((LOCKSTATE=CHECKLOCK)•!LOCK_ •(MLOCK+!PCILOCKREQ))

The BACKOFF state is entered when the PCI request is started but cannot be continued because the P2IQ is not empty. As discussed above, to maintain data consistency and ordering, the P2IQ must be flushed before a PCI master can access memory 214. In the BACKOFF state, the TARGETSM 874 asserts the conventional PCI signals, such as STOP and TRDY to force the PCI master to retry the cycle at a later time. The TARGETSM 874 transitions back to IDLE when FRAME_ is deasserted.

The LOCKREQ state is entered when the PCI master requests a locked cycle. The TARGETSM 874 transitions back to the IDLE state when the FRAME_ signal is deasserted, the MLOCK signal is asserted and the byte address input latch count (BAILCNT[3:0]) is equal to Ch; or when the FRAME_ signal is deasserted, the P2IFLSHREQ and PSTOFFREQ signals are asserted and either MLOCK is deasserted or BAILCNT[3:0] is not equal to Ch. The TARGETSM 874 transitions to state READINC if a memory write command is not requested; P2IFLSHREQ or PSTOFFREQ is deasserted; and MLOCK is deasserted or BAILCNT[3:0]=Ch. The TARGETSM 874 transitions to state BACKOFF if MLOCK is asserted, BAILCNT[3:0]=Ch and FRAME_ is asserted; or MLOCK is deasserted or BAILCNT[3:0] is not equal to Ch, and P2IFLSHREQ, PSTOFFREQ and FRAME_ are asserted.

Therefore, according to the above described invention, if the P2IQ is not empty when a PCI master requests access to memory 214, the PSTOFFREQ signal is asserted to flush the P2IQ. After the P2IQ has been flushed, a timer is started to keep the P2IQ empty long enough for the initial requesting PCI master to have access to memory, thereby eliminating the data starvation of the PCI master.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system, comprising:
    a processor bus;

a processor coupled to said processor bus;

a memory;

a local bus;

a bus mastering device coupled to said local bus;

a controller coupled to said memory and between said local bus and said processor bus, said controller comprising:

a processor interface operable to interface said processor to said memory and said local bus, said processor interface having a write posting queue for receiving write cycles from said processor as long as a posting disable request is not received, said write cycles being destined for said local bus;

a local bus interface operable to interface said local bus to said memory and said processor, said local bus interface receiving memory access requests from said bus mastering device and providing access to said memory if said write posting queue is empty, said local bus interface providing a posting disable request to said processor interface when posting is not desired; and a memory interface operable to interface said memory to said processor and said local bus;

wherein if a memory access request is received from said bus mastering device and said write posting queue is not empty, said posting disable request is provided to allow said write posting queue to empty, and wherein if a memory access request is received from said bus mastering device and said write posting queue is empty, said memory access request is completed.

2. The computer system of claim 1 wherein when a memory access request is received and said write posting queue is not empty, a bus mastering device is forced to retry said memory access request.

3. The computer system of claim 1, wherein the local bus interface further comprises:

a timer for extending the provision of said posting disable request after said write posting queue is empty, said timer having a programmable extension period.

4. The computer system of claim 3, wherein said timer is started after said posting disable request is provided and said write posting queue is empty, and wherein said timer is stopped when said programmable extension period is reached.

5. A controller for coupling memory to a processor and a bus mastering device, said processor coupled to a processor bus, said bus mastering device coupled to a local bus, the controller comprising:

a processor interface operable to interface said processor to said memory and said local bus, said processor interface having a write posting queue for receiving write cycles from said processor as long as a posting disable request is not received, said write cycles being destined for said local bus;

a local bus interface operable to interface said local bus to said memory and said processor, said local bus interface receiving memory access requests from said bus mastering device and providing access to said memory if said write posting queue is not empty, said local bus interface providing a posting disable request to said processor interface when posting is not desired; and a memory interface operable to interface said memory to said processor and said local bus;

wherein if a memory access request is received from said bus mastering device and said write posting queue is not empty, said posting disable request is provided to allow said write posting queue to empty, and wherein if a memory access request is received from said bus mastering device and said write posting queue is empty said memory access request is completed.

6. The controller of claim 5 wherein when a memory access request is received and said write posting queue is not empty, that bus mastering device is forced to retry said memory access request.

7. The controller of claim 5, wherein the local bus interface further comprises:

a timer for extending the provision of said posting disable request after said write posting queue is empty, said timer having a programmable extension period.

8. The controller of claim 7, wherein said controller is started after said posting disable request is provided and said write posting queue is empty, and wherein said timer is stopped when said programmable extension period is reached.

9. A method of accessing a memory by a local bus device, the local bus device being coupled to a local bus, the local bus coupled to a controller, the controller coupled to the memory and to a processor, the controller having a write posting queue for receiving write cycles destined for the local bus, the method comprising the steps of:

(a) receiving a memory access cycle from the local bus device;

(b) determining if the write posting queue is empty;

(c) disabling posting to said write posting queue until said write posting queue clears if said write posting queue is not empty after step b;

(d) forcing said local bus device to retry said memory access cycle if said write posting queue is not empty after step b;

(e) disabling posting to said write posting queue for a predetermined time period after said write posting queue clears in step c; and (f) completing said memory access cycle during step e.

10. The method of claim 9, further comprising the step of:

(a) enabling posting after said predetermined time period has elapsed.

11. A computer system, comprising:

a processor bus;

a processor coupled to said processor bus;

a memory;

a local bus;

a bus mastering hard disk system coupled to said local bus;

a controller coupled to said memory and between said local bus and said processor bus, said controller comprising:

a processor interface operable to interface said processor to said memory and said local bus, said processor interface having a write posting queue for receiving write cycles from said processor as long as a posting disable request is not received, said write cycles being destined for said local bus;

a local bus interface operable to interface said local bus to said memory and said processor, said local bus interface receiving memory access requests from said bus mastering hard disk system and providing access to said memory if said write posting queue is empty, said local bus interface providing a posting disable request to said processor interface when posting is not desired; and a memory interface operable to interface said memory to said processor and said local bus;

wherein if a memory access request is received from said bus mastering hard disk system and said write posting queue is not empty, said posting disable request is provided to allow said write posting queue to empty, and wherein if a memory access request is received from said bus mastering hard disk system and said write posting queue is empty, said memory access request is completed.

12. The computer system of claim 11, wherein when a memory access request is received and said write posting queue is not empty, said bus mastering hard disk system is forced to retry said memory access request.

13. The computer system of claim 11, wherein the local bus interface further comprises:

a timer for extending the provision of said posting disable request after said write posting queue is empty, said timer having a programmable extension period.

14. The computer system of claim 13, wherein said timer is started after said posting disable request is provided and said write posting queue is empty, and wherein said timer is stopped when said programmable extension period is reached.

* * * * *